United States Patent
Yan et al.

(10) Patent No.: US 10,991,110 B2
(45) Date of Patent: Apr. 27, 2021

(54) METHODS AND SYSTEMS TO MODIFY A TWO DIMENSIONAL FACIAL IMAGE TO INCREASE DIMENSIONAL DEPTH AND GENERATE A FACIAL IMAGE THAT APPEARS THREE DIMENSIONAL

(71) Applicant: Activision Publishing, Inc., Santa Monica, CA (US)

(72) Inventors: Paul D. Yan, Novato, CA (US); Thitikun Vorachart, San Rafael, CA (US)

(73) Assignee: Activision Publishing, Inc., Santa Monica, CA (US)

( * ) Notice: Subject to any disclaimer, the term of this patent is extended or adjusted under 35 U.S.C. 154(b) by 0 days.

(21) Appl. No.: 16/844,095

(22) Filed: Apr. 9, 2020

(65) Prior Publication Data
US 2020/0302623 A1    Sep. 24, 2020

Related U.S. Application Data

(63) Continuation of application No. 16/041,529, filed on Jul. 20, 2018, now Pat. No. 10,650,539, which is a
(Continued)

(51) Int. Cl.
| | |
|---|---|
| *G06T 11/00* | (2006.01) |
| *G06T 7/50* | (2017.01) |
| *G06K 9/00* | (2006.01) |
| *G06K 9/62* | (2006.01) |
| *G06T 15/04* | (2011.01) |

(52) U.S. Cl.
CPC ............ *G06T 7/50* (2017.01); *G06K 9/00208* (2013.01); *G06K 9/00268* (2013.01); *G06K 9/621* (2013.01); *G06T 11/00* (2013.01); *G06T 15/04* (2013.01)

(58) Field of Classification Search
None
See application file for complete search history.

(56) References Cited

U.S. PATENT DOCUMENTS

| | | | |
|---|---|---|---|
| 5,530,796 A | 6/1996 | Wang | |
| 5,561,736 A | 10/1996 | Moore | |
| (Continued) | | | |

FOREIGN PATENT DOCUMENTS

| | | |
|---|---|---|
| AU | 768367 | 3/2004 |
| AU | 2005215048 | 10/2011 |
| (Continued) | | |

OTHER PUBLICATIONS

Mian et al. "Keypoint Detection and Local Feature Matching for Textured 3D Face Recognition", Dec. 2008, pp. 1-12 (Year: 2008).*
(Continued)

*Primary Examiner* — Robert J Craddock
(74) *Attorney, Agent, or Firm* — Novel IP

(57) ABSTRACT

The specification describes methods and systems for increasing a dimensional depth of a two-dimensional image of a face to yield a face image that appears three dimensional. The methods and systems identify key points on the 2-D image, obtain a texture map for the 2-D image, determines one or more proportions within the 2-D image, and adjusts the texture map of the 3-D model based on the determined one or more proportions within the 2-D image.

24 Claims, 19 Drawing Sheets

Related U.S. Application Data continuation of application No. 15/370,166, filed on Dec. 6, 2016, now Pat. No. 10,055,880.

(56) References Cited

U.S. PATENT DOCUMENTS

| | | | |
|---|---|---|---|
| 5,563,946 | A | 10/1996 | Cooper |
| 5,685,775 | A | 11/1997 | Bakoglu |
| 5,706,507 | A | 1/1998 | Schloss |
| 5,708,764 | A | 1/1998 | Borrel |
| 5,736,985 | A | 4/1998 | Lection |
| 5,737,416 | A | 4/1998 | Cooper |
| 5,745,678 | A | 4/1998 | Herzberg |
| 5,762,552 | A | 6/1998 | Vuong |
| 5,768,511 | A | 6/1998 | Galvin |
| 5,825,877 | A | 10/1998 | Dan |
| 5,835,692 | A | 11/1998 | Cragun |
| 5,878,233 | A | 3/1999 | Schloss |
| 5,883,628 | A | 3/1999 | Mullaly |
| 5,886,702 | A | 3/1999 | Migdal |
| 5,900,879 | A | 5/1999 | Berry |
| 5,903,266 | A | 5/1999 | Berstis |
| 5,903,271 | A | 5/1999 | Bardon |
| 5,911,045 | A | 6/1999 | Leyba |
| 5,920,325 | A | 7/1999 | Morgan |
| 5,923,324 | A | 7/1999 | Berry |
| 5,926,575 | A | 7/1999 | Ohzeki |
| 5,969,724 | A | 10/1999 | Berry |
| 5,977,979 | A | 11/1999 | Clough |
| 5,990,888 | A | 11/1999 | Blades |
| 6,014,145 | A | 1/2000 | Bardon |
| 6,025,839 | A | 2/2000 | Schell |
| 6,059,842 | A | 5/2000 | Dumarot |
| 6,069,632 | A | 5/2000 | Mullaly |
| 6,081,270 | A | 6/2000 | Berry |
| 6,081,271 | A | 6/2000 | Bardon |
| 6,091,410 | A | 7/2000 | Lection |
| 6,094,196 | A | 7/2000 | Berry |
| 6,098,056 | A | 8/2000 | Rusnak |
| 6,104,406 | A | 8/2000 | Berry |
| 6,111,581 | A | 8/2000 | Berry |
| 6,134,588 | A | 10/2000 | Guenthner |
| 6,144,381 | A | 11/2000 | Lection |
| 6,148,328 | A | 11/2000 | Cuomo |
| 6,179,713 | B1 | 1/2001 | James |
| 6,185,614 | B1 | 2/2001 | Cuomo |
| 6,201,881 | B1 | 3/2001 | Masuda |
| 6,222,551 | B1 | 4/2001 | Schneider |
| 6,271,842 | B1 | 8/2001 | Bardon |
| 6,271,843 | B1 | 8/2001 | Lection |
| 6,282,547 | B1 | 8/2001 | Hirsch |
| 6,311,206 | B1 | 10/2001 | Malkin |
| 6,334,141 | B1 | 12/2001 | Varma |
| 6,336,134 | B1 | 1/2002 | Varma |
| 6,337,700 | B1 | 1/2002 | Kinoe |
| 6,353,449 | B1 | 3/2002 | Gregg |
| 6,356,297 | B1 | 3/2002 | Cheng |
| 6,411,312 | B1 | 6/2002 | Sheppard |
| 6,426,757 | B1 | 7/2002 | Smith |
| 6,445,389 | B1 | 9/2002 | Bossen |
| 6,452,593 | B1 | 9/2002 | Challener |
| 6,462,760 | B1 | 10/2002 | Cox, Jr. |
| 6,466,550 | B1 | 10/2002 | Foster |
| 6,469,712 | B1 | 10/2002 | Hilpert, Jr. |
| 6,473,085 | B1 | 10/2002 | Brock |
| 6,499,053 | B1 | 12/2002 | Marquette |
| 6,505,208 | B1 | 1/2003 | Kanevsky |
| 6,509,925 | B1 | 1/2003 | Dermler |
| 6,525,731 | B1 | 2/2003 | Suits |
| 6,549,933 | B1 | 4/2003 | Barrett |
| 6,567,109 | B1 | 5/2003 | Todd |
| 6,567,813 | B1 | 5/2003 | Zhu |
| 6,618,751 | B1 | 9/2003 | Challenger |
| RE38,375 | E | 12/2003 | Herzberg |
| 6,657,617 | B2 | 12/2003 | Paolini |
| 6,657,642 | B1 | 12/2003 | Bardon |
| 6,684,255 | B1 | 1/2004 | Martin |
| 6,717,600 | B2 | 4/2004 | Dutta |
| 6,734,884 | B1 | 5/2004 | Berry |
| 6,765,596 | B2 | 7/2004 | Lection |
| 6,781,607 | B1 | 8/2004 | Benham |
| 6,819,669 | B2 | 11/2004 | Rooney |
| 6,832,239 | B1 | 12/2004 | Kraft |
| 6,836,480 | B2 | 12/2004 | Basso |
| 6,845,389 | B1 | 1/2005 | Sen |
| 6,886,026 | B1 | 4/2005 | Hanson |
| 6,919,892 | B1 | 7/2005 | Cheiky |
| 6,948,168 | B1 | 9/2005 | Kuprionas |
| RE38,865 | E | 11/2005 | Dumarot |
| 6,963,824 | B1 | 11/2005 | Davidson |
| 6,993,596 | B2 | 1/2006 | Hinton |
| 7,006,616 | B1 | 2/2006 | Christofferson |
| 7,028,296 | B2 | 4/2006 | Irfan |
| 7,062,533 | B2 | 6/2006 | Brown |
| 7,143,409 | B2 | 11/2006 | Herrero |
| 7,196,705 | B2 | 3/2007 | Gallivan |
| 7,209,137 | B2 | 4/2007 | Brokenshire |
| 7,230,616 | B2 | 6/2007 | Taubin |
| 7,249,123 | B2 | 7/2007 | Elder |
| 7,263,511 | B2 | 8/2007 | Bodin |
| 7,287,053 | B2 | 10/2007 | Bodin |
| 7,305,438 | B2 | 12/2007 | Christensen |
| 7,308,476 | B2 | 12/2007 | Mannaru |
| 7,404,149 | B2 | 7/2008 | Fox |
| 7,426,538 | B2 | 9/2008 | Bodin |
| 7,427,980 | B1 | 9/2008 | Partridge |
| 7,428,588 | B2 | 9/2008 | Berstis |
| 7,429,987 | B2 | 9/2008 | Leah |
| 7,436,407 | B2 | 10/2008 | Doi |
| 7,439,975 | B2 | 10/2008 | Hsu |
| 7,443,393 | B2 | 10/2008 | Shen |
| 7,447,996 | B1 | 11/2008 | Cox |
| 7,467,181 | B2 | 12/2008 | McGowan |
| 7,475,354 | B2 | 1/2009 | Guido |
| 7,478,127 | B2 | 1/2009 | Creamer |
| 7,484,012 | B2 | 1/2009 | Hinton |
| 7,503,007 | B2 | 3/2009 | Goodman |
| 7,506,264 | B2 | 3/2009 | Polan |
| 7,515,136 | B1 | 4/2009 | Kanevsky |
| 7,525,964 | B2 | 4/2009 | Astley |
| 7,552,177 | B2 | 6/2009 | Kessen |
| 7,565,650 | B2 | 7/2009 | Bhogal |
| 7,571,224 | B2 | 8/2009 | Childress |
| 7,571,389 | B2 | 8/2009 | Broussard |
| 7,580,888 | B2 | 8/2009 | Ur |
| 7,596,596 | B2 | 9/2009 | Chen |
| 7,640,587 | B2 | 12/2009 | Fox |
| 7,667,701 | B2 | 2/2010 | Leah |
| 7,698,656 | B2 | 4/2010 | Srivastava |
| 7,702,784 | B2 | 4/2010 | Berstis |
| 7,714,867 | B2 | 5/2010 | Doi |
| 7,719,532 | B2 | 5/2010 | Schardt |
| 7,719,535 | B2 | 5/2010 | Tadokoro |
| 7,734,691 | B2 | 6/2010 | Creamer |
| 7,737,969 | B2 | 6/2010 | Shen |
| 7,743,095 | B2 | 6/2010 | Goldberg |
| 7,747,679 | B2 | 6/2010 | Galvin |
| 7,765,478 | B2 | 7/2010 | Reed |
| 7,768,514 | B2 | 8/2010 | Pagan |
| 7,773,087 | B2 | 8/2010 | Fowler |
| 7,774,407 | B2 | 8/2010 | Daly |
| 7,782,318 | B2 | 8/2010 | Shearer |
| 7,792,263 | B2 | 9/2010 | D Amora |
| 7,792,801 | B2 | 9/2010 | Hamilton, II |
| 7,796,128 | B2 | 9/2010 | Radzikowski |
| 7,808,500 | B2 | 10/2010 | Shearer |
| 7,814,152 | B2 | 10/2010 | McGowan |
| 7,827,318 | B2 | 11/2010 | Hinton |
| 7,843,471 | B2 | 11/2010 | Doan |
| 7,844,663 | B2 | 11/2010 | Boutboul |
| 7,847,799 | B2 | 12/2010 | Taubin |
| 7,856,469 | B2 | 12/2010 | Chen |
| 7,873,485 | B2 | 1/2011 | Castelli |
| 7,876,931 | B2 | 1/2011 | Geng |
| 7,882,222 | B2 | 2/2011 | Dolbier |

(56) References Cited

U.S. PATENT DOCUMENTS

| | | |
|---|---|---|
| 7,882,243 B2 | 2/2011 | Ivory |
| 7,884,819 B2 | 2/2011 | Kuesel |
| 7,886,045 B2 | 2/2011 | Bates |
| 7,890,623 B2 | 2/2011 | Bates |
| 7,893,936 B2 | 2/2011 | Shearer |
| 7,904,829 B2 | 3/2011 | Fox |
| 7,921,128 B2 | 4/2011 | Hamilton, II |
| 7,940,265 B2 | 5/2011 | Brown |
| 7,945,620 B2 | 5/2011 | Bou-Ghannam |
| 7,945,802 B2 | 5/2011 | Hamilton, II |
| 7,970,837 B2 | 6/2011 | Lyle |
| 7,970,840 B2 | 6/2011 | Cannon |
| 7,985,138 B2 | 7/2011 | Acharya |
| 7,990,387 B2 | 8/2011 | Hamilton, II |
| 7,996,164 B2 | 8/2011 | Hamilton, II |
| 8,001,161 B2 | 8/2011 | Finn |
| 8,004,518 B2 | 8/2011 | Fowler |
| 8,005,025 B2 | 8/2011 | Bodin |
| 8,006,182 B2 | 8/2011 | Bates |
| 8,013,861 B2 | 9/2011 | Hamilton, II |
| 8,018,453 B2 | 9/2011 | Fowler |
| 8,018,462 B2 | 9/2011 | Bhogal |
| 8,019,797 B2 | 9/2011 | Hamilton, II |
| 8,019,858 B2 | 9/2011 | Bauchot |
| 8,022,948 B2 | 9/2011 | Garbow |
| 8,022,950 B2 | 9/2011 | Brown |
| 8,026,913 B2 | 9/2011 | Garbow |
| 8,028,021 B2 | 9/2011 | Reisinger |
| 8,028,022 B2 | 9/2011 | Brownholtz |
| 8,037,416 B2 | 10/2011 | Bates |
| 8,041,614 B2 | 10/2011 | Bhogal |
| 8,046,700 B2 | 10/2011 | Bates |
| 8,051,462 B2 | 11/2011 | Hamilton, II |
| 8,055,656 B2 | 11/2011 | Cradick |
| 8,056,121 B2 | 11/2011 | Hamilton, II |
| 8,057,307 B2 | 11/2011 | Berstis |
| 8,062,130 B2 | 11/2011 | Smith |
| 8,063,905 B2 | 11/2011 | Brown |
| 8,070,601 B2 | 12/2011 | Acharya |
| 8,082,245 B2 | 12/2011 | Bates |
| 8,085,267 B2 | 12/2011 | Brown et al. |
| 8,089,481 B2 | 1/2012 | Shearer |
| 8,092,288 B2 | 1/2012 | Theis |
| 8,095,881 B2 | 1/2012 | Reisinger |
| 8,099,338 B2 | 1/2012 | Betzler |
| 8,099,668 B2 | 1/2012 | Garbow |
| 8,102,334 B2 | 1/2012 | Brown |
| 8,103,640 B2 | 1/2012 | Lo |
| 8,103,959 B2 | 1/2012 | Cannon |
| 8,105,165 B2 | 1/2012 | Karstens |
| 8,108,774 B2 | 1/2012 | Finn |
| 8,113,959 B2 | 2/2012 | De Judicibus |
| 8,117,551 B2 | 2/2012 | Cheng |
| 8,125,485 B2 | 2/2012 | Brown |
| 8,127,235 B2 | 2/2012 | Haggar |
| 8,127,236 B2 | 2/2012 | Hamilton, II |
| 8,128,487 B2 | 3/2012 | Hamilton, II |
| 8,131,740 B2 | 3/2012 | Cradick |
| 8,132,235 B2 | 3/2012 | Bussani |
| 8,134,560 B2 | 3/2012 | Bates |
| 8,139,060 B2 | 3/2012 | Brown |
| 8,139,780 B2 | 3/2012 | Shearer |
| 8,140,340 B2 | 3/2012 | Bhogal |
| 8,140,620 B2 | 3/2012 | Creamer |
| 8,140,978 B2 | 3/2012 | Betzler |
| 8,140,982 B2 | 3/2012 | Hamilton, II |
| 8,145,676 B2 | 3/2012 | Bhogal |
| 8,145,725 B2 | 3/2012 | Dawson |
| 8,149,241 B2 | 4/2012 | Do |
| 8,151,191 B2 | 4/2012 | Nicol, II |
| 8,156,184 B2 | 4/2012 | Kurata |
| 8,165,350 B2 | 4/2012 | Fuhrmann |
| 8,171,407 B2 | 5/2012 | Huang |
| 8,171,408 B2 | 5/2012 | Dawson |
| 8,171,559 B2 | 5/2012 | Hamilton, II |
| 8,174,541 B2 | 5/2012 | Greene |
| 8,176,421 B2 | 5/2012 | Dawson |
| 8,176,422 B2 | 5/2012 | Bergman |
| 8,184,092 B2 | 5/2012 | Cox |
| 8,184,116 B2 | 5/2012 | Finn |
| 8,185,450 B2 | 5/2012 | McVey |
| 8,185,829 B2 | 5/2012 | Cannon |
| 8,187,067 B2 | 5/2012 | Hamilton, II |
| 8,199,145 B2 | 6/2012 | Hamilton, II |
| 8,203,561 B2 | 6/2012 | Carter |
| 8,214,335 B2 | 7/2012 | Hamilton, II |
| 8,214,433 B2 | 7/2012 | Dawson |
| 8,214,750 B2 | 7/2012 | Hamilton, II |
| 8,214,751 B2 | 7/2012 | Dawson |
| 8,217,953 B2 | 7/2012 | Comparan |
| 8,219,616 B2 | 7/2012 | Dawson |
| 8,230,045 B2 | 7/2012 | Kawachiya |
| 8,230,338 B2 | 7/2012 | Dugan |
| 8,233,005 B2 | 7/2012 | Finn |
| 8,234,234 B2 | 7/2012 | Shearer |
| 8,234,579 B2 | 7/2012 | Do |
| 8,239,775 B2 | 8/2012 | Beverland |
| 8,241,131 B2 | 8/2012 | Bhogal |
| 8,245,241 B2 | 8/2012 | Hamilton, II |
| 8,245,283 B2 | 8/2012 | Dawson |
| 8,265,253 B2 | 9/2012 | D Amora |
| 8,310,497 B2 | 11/2012 | Comparan |
| 8,334,871 B2 | 12/2012 | Hamilton, II |
| 8,360,886 B2 | 1/2013 | Karstens |
| 8,364,804 B2 | 1/2013 | Childress |
| 8,425,326 B2 | 4/2013 | Chudley |
| 8,442,946 B2 | 5/2013 | Hamilton, II |
| 8,506,372 B2 | 8/2013 | Chudley |
| 8,514,249 B2 | 8/2013 | Hamilton, II |
| 8,554,841 B2 | 10/2013 | Kurata |
| 8,607,142 B2 | 12/2013 | Bergman |
| 8,607,356 B2 | 12/2013 | Hamilton, II |
| 8,624,903 B2 | 1/2014 | Hamilton, II |
| 8,626,836 B2 | 1/2014 | Dawson |
| 8,692,835 B2 | 4/2014 | Hamilton, II |
| 8,721,412 B2 | 5/2014 | Chudley |
| 8,730,231 B2 | 5/2014 | Snoddy |
| 8,827,816 B2 | 9/2014 | Bhogal |
| 8,838,640 B2 | 9/2014 | Bates |
| 8,849,917 B2 | 9/2014 | Dawson |
| 8,911,296 B2 | 12/2014 | Chudley |
| 8,992,316 B2 | 3/2015 | Smith |
| 9,083,654 B2 | 7/2015 | Dawson |
| 9,152,914 B2 | 10/2015 | Haggar |
| 9,205,328 B2 | 12/2015 | Bansi |
| 9,286,731 B2 | 3/2016 | Hamilton, II |
| 9,298,257 B2 | 3/2016 | Hwang |
| 9,299,080 B2 | 3/2016 | Dawson |
| 9,299,127 B2 | 3/2016 | Pekofsky |
| 9,364,746 B2 | 6/2016 | Chudley |
| 9,525,746 B2 | 12/2016 | Bates |
| 9,583,109 B2 | 2/2017 | Kurata |
| 9,682,324 B2 | 6/2017 | Bansi |
| 9,764,244 B2 | 9/2017 | Bansi |
| 9,789,406 B2 | 10/2017 | Marr |
| 9,808,722 B2 | 11/2017 | Kawachiya |
| 10,127,722 B2 * | 11/2018 | Shakib .................. G06T 19/003 |
| 2004/0014514 A1 | 1/2004 | Yacenda |
| 2004/0228291 A1 | 11/2004 | Huslak |
| 2004/0263510 A1 | 12/2004 | Marschner |
| 2005/0065802 A1 | 3/2005 | Rui |
| 2005/0083248 A1 | 4/2005 | Biocca |
| 2009/0113448 A1 | 4/2009 | Smith |
| 2009/0195545 A1 | 8/2009 | Debevec |
| 2010/0007665 A1 | 1/2010 | Smith |
| 2012/0062719 A1 | 3/2012 | Debevec |
| 2014/0160123 A1 | 6/2014 | Yang |
| 2014/0344725 A1 | 11/2014 | Bates |
| 2016/0191671 A1 | 6/2016 | Dawson |

(56) References Cited

U.S. PATENT DOCUMENTS

| | | | |
|---|---|---|---|
| 2017/0032055 | A1 | 2/2017 | Eisemann |
| 2018/0197322 | A1 | 7/2018 | Sagar |

FOREIGN PATENT DOCUMENTS

| | | | |
|---|---|---|---|
| CA | 2143874 | | 6/2000 |
| CA | 2292678 | | 7/2005 |
| CA | 2552135 | | 7/2013 |
| CN | 1334650 | A | 2/2002 |
| CN | 1202652 | C | 10/2002 |
| CN | 1141641 | C | 3/2004 |
| CN | 1494679 | A | 5/2004 |
| CN | 1219384 | | 9/2005 |
| CN | 1307544 | | 3/2007 |
| CN | 100407675 | | 7/2008 |
| CN | 100423016 | C | 10/2008 |
| CN | 100557637 | | 11/2009 |
| CN | 101001678 | B | 5/2010 |
| CN | 101436242 | | 12/2010 |
| CN | 101801482 | B | 12/2014 |
| EP | 668583 | | 8/1995 |
| EP | 0627728 | B1 | 9/2000 |
| EP | 0717337 | B1 | 8/2001 |
| EP | 1207694 | A2 | 5/2002 |
| EP | 0679977 | B1 | 10/2002 |
| EP | 0679978 | B1 | 3/2003 |
| EP | 0890924 | B1 | 9/2003 |
| EP | 1377902 | B1 | 8/2004 |
| EP | 0813132 | B1 | 1/2005 |
| EP | 1380133 | B1 | 3/2005 |
| EP | 1021021 | B1 | 9/2005 |
| EP | 0930584 | B1 | 10/2005 |
| EP | 0883087 | B1 | 8/2007 |
| EP | 1176828 | B1 | 10/2007 |
| EP | 2076888 | B1 | 7/2015 |
| GB | 2339938 | | 10/2002 |
| GB | 2352154 | | 7/2003 |
| JP | 3033956 | B2 | 4/2000 |
| JP | 3124916 | B2 | 1/2001 |
| JP | 3177221 | B2 | 6/2001 |
| JP | 2001204973 | A | 7/2001 |
| JP | 3199231 | B2 | 8/2001 |
| JP | 3210558 | B2 | 9/2001 |
| JP | 2001350802 | A | 12/2001 |
| JP | 3275935 | | 2/2002 |
| JP | 3361745 | | 1/2003 |
| JP | 3368188 | B2 | 1/2003 |
| JP | 3470955 | B | 9/2003 |
| JP | 3503774 | | 12/2003 |
| JP | 2004021773 | A | 1/2004 |
| JP | 3575598 | | 7/2004 |
| JP | 3579823 | B | 7/2004 |
| JP | 3579154 | B2 | 10/2004 |
| JP | 3701773 | B2 | 10/2005 |
| JP | 3777161 | | 3/2006 |
| JP | 3914430 | B | 2/2007 |
| JP | 3942090 | B | 4/2007 |
| JP | 3962361 | | 5/2007 |
| JP | 4009235 | B | 9/2007 |
| JP | 4225376 | | 12/2008 |
| JP | 4653075 | | 12/2010 |
| JP | 5063698 | B | 8/2012 |
| JP | 5159375 | B2 | 3/2013 |
| JP | 5352200 | B2 | 11/2013 |
| JP | 5734566 | B2 | 6/2015 |
| KR | 20020038229 | A | 5/2002 |
| KR | 20030039019 | A | 5/2003 |
| MY | 117864 | A | 8/2004 |
| SG | 55396 | | 12/1998 |
| TW | 424213 | | 3/2001 |
| TW | 527825 | | 4/2003 |
| WO | 0203645 | A2 | 1/2002 |
| WO | 2002073457 | | 9/2002 |
| WO | 20020087156 | | 10/2002 |
| WO | 03049459 | A1 | 6/2003 |
| WO | 03058518 | A2 | 7/2003 |
| WO | 2004086212 | | 10/2004 |
| WO | 2005079538 | | 9/2005 |
| WO | 2007101785 | | 9/2007 |
| WO | 2008037599 | | 4/2008 |
| WO | 2008074627 | | 6/2008 |
| WO | 2008095767 | | 8/2008 |
| WO | 2009037257 | | 3/2009 |
| WO | 2009104564 | | 8/2009 |
| WO | 2010096738 | A1 | 8/2010 |

OTHER PUBLICATIONS

Takahashi, et al., "A Three-Dimension Automatic Mesh Generation System Using Shape Recognition Technique", 1993.

Taghavi, Reza, "Automatic Block Decomposition Using Fuzzy Logic Analysis", 9.sup.th International Meshing Roundtable, New Orleans, Louisiana, Oct. 2000.

"An Approach for Eliminating Self-Intersecting Recognition Models for Hexahedral Mesh Generation," 2003, pp. 1-14.

Deerwester et al. "Indexing by Latent Semantic Analysis," 1990, pp. 1-34.

International Search Report as Published as WO2005/079538 in corresponding international application No. PCT/US2005/005550, dated Jul. 5, 2006.

* cited by examiner

METHODS AND SYSTEMS TO MODIFY A TWO DIMENSIONAL FACIAL IMAGE TO INCREASE DIMENSIONAL DEPTH AND GENERATE A FACIAL IMAGE THAT APPEARS THREE DIMENSIONAL

CROSS-REFERENCE

The present application is a continuation application of U.S. patent application Ser. No. 16/041,529, entitled "Methods and Systems to Modify a Two Dimensional Facial Image to Increase Dimensional Depth and Generate a Facial Image That Appears Three Dimensional" and filed on Jul. 18, 2018, which is a continuation application of U.S. patent application Ser. No. 15/370,166, of the same title, filed on Dec. 6, 2016, and issued as U.S. Pat. No. 10,055,880 on Aug. 21, 2018, both of which are herein incorporated by reference in their entirety.

FIELD

The present specification discloses systems and methods for modifying a facial image. More specifically, the present specification is related to modifying a two-dimensional (2-D) facial image to obtain a corresponding modified facial image that has an increased dimensional depth, thereby appearing to be a three-dimensional (3-D) facial image. The 3D facial image can then be integrated into a game in the form of an avatar and displayed in a graphical user interface.

BACKGROUND

A three-dimensional (3-D) image provides a perception of depth, and can be used in a variety of virtual environments. A virtual environment provides an interactive experience, in the form of virtual reality, to a user. 3-D imagery is becoming intensely popular in virtual environments that are experienced on screens, or special display devices such as head mounted devices or goggles. 3-D imagery is also used in gaming systems, simulations, architectural walkthroughs, and in several other scenarios.

The process of creating and displaying three-dimensional (3D) objects in an interactive computer environment is a complicated matter. The complexity increases with the need to convert a 2-D image to a corresponding 3-D model. A 2-D image includes two axes, whereas a 3-D image incorporates a third axis, which provides the depth component. It should be appreciated that the 3-D image is still being displayed on a two dimensional display but it has been modified, relative to the 2-D image, to include a dimensional depth that, when viewed by a user, makes the flat, planar image visually appear to be three dimensional.

Commonly available methods that convert a 2-D image to a corresponding 3-D model require combining multiple images that provide multiple views of the 2-D image. For example, a front view photo and a side view photo of a face may be required to recreate the face in 3-D. Some methods require specialized software programs to covert one or multiple 2-D input images to a 3-D output model. Yet other methods require a technician to work with specialized software programs to convert a 2-D image in to a corresponding 3-D model. These methods may significantly increase computational complexity, or may require time-consuming manual interventions in adjusting and/or aligning 2-D image(s) to create a corresponding 3-D model. Moreover, computerized methods of converting 2-D images of faces, such as faces of humans, pose several limitations in understanding the human face and features that vary widely with each individual. Some other methods, such as UV mapping, involve projecting a 2-D image on to a 3-D model surface to obtain texturized 2-D image. However, these methods are unable to match specific facial features from the 2-D image of a face to the corresponding 3-D mesh model.

There is a need for improved, automated methods and systems for converting a single 2-D image to a corresponding image with increased dimensional depth to create an image that appears 3-D. There is also a need for improved, automated methods and systems for converting a single 2-D image to a corresponding 3-D image in substantially real time, which can overcome the above limitations and disadvantages of the current methods.

SUMMARY

The following embodiments and aspects thereof are described and illustrated in conjunction with systems, tools and methods, which are meant to be exemplary and illustrative, not limiting in scope.

In some embodiments, the present specification discloses a computer-implemented method for increasing a dimensional depth of a two-dimensional image of a face to yield a face image that appears three dimensional, said method being implemented in a computer having a processor and a random access memory, wherein said processor is in data communication with a display and with a storage unit, the method comprising: acquiring from the storage unit the two-dimensional image of the face; acquiring from the storage unit a three-dimensional mesh image; using said computer and executing a plurality of programmatic instructions stored in the storage unit, identifying a plurality of key points on the two-dimensional image of the face; using said computer and executing a plurality of programmatic instructions stored in the storage unit, generating a texture map of the two-dimensional image of the face; using said computer and executing a plurality of programmatic instructions stored in the storage unit, projecting said texture map of the two-dimensional image of the face onto the three-dimensional mesh image; using said computer and executing a plurality of programmatic instructions stored in the storage unit, determining a first set of one or more proportions within the two-dimensional image of the face; using said computer and executing a plurality of programmatic instructions stored in the storage unit, determining a second set of one or more proportions within the three-dimensional mesh image; using said computer and executing a plurality of programmatic instructions stored in the storage unit, determining a plurality of scaling factors, wherein each of said scaling factors is a function of one of said first set of one or more proportions and a corresponding one of said second set of one or more proportions; using said computer and executing a plurality of programmatic instructions stored in the storage unit, adjusting the three-dimensional mesh image based on the determined plurality of scaling factors to yield the face image that appears three dimensional; and using said computer, outputting the face image that appears three dimensional.

In some embodiments, the key points may include points representative of a plurality of anatomical locations on the face, wherein said anatomical locations include points located on the eyebrows, eyes, nose, and lips.

Optionally, the texture map comprises a plurality of non-overlapping, triangular regions.

Optionally, each of said plurality of scaling factors is a ratio of one of said first set of one or more proportions to the corresponding one of said second set of one or more proportions.

In some embodiments, the determining the first set of one or more proportions within the two-dimensional image may comprise determining proportions from measurements between at least two anatomical positions on the face.

In some embodiments, the determining a first set of one or more proportions within the two-dimensional image may comprise determining a first anatomical distance and dividing said first anatomical distance by a second anatomical distance.

Optionally, the first anatomical distance is at least one of a lateral face width, a lateral jaw width, a lateral temple width, a lateral eyebrow width, a lateral chin width, a lateral lip width, and a lateral nose width and wherein the second anatomical distance is a distance between two temples of the face. Still optionally, the first anatomical distance is at least one of a vertically defined lip thickness, a vertical distance between a nose and a nose bridge, a vertical distance between a lip and a nose bridge, a vertical distance between a chin and a nose bridge, a vertical eye length, and a vertical distance between a jaw and a nose bridge and wherein the second anatomical distance is at least one of a distance between two anatomical positions on said face and a distance between two temples of the face. Still optionally, the first anatomical distance is a distance between two anatomical positions on said face and the second anatomical distance is a distance between a point located proximate a left edge of a left eyebrow of the face and a point located proximate a right edge of a right eyebrow of the face.

Optionally, the determining a second set of one or more proportions within the three-dimensional mesh image comprises determining a first anatomical distance and dividing said first anatomical distance by a second anatomical distance.

Optionally, the first anatomical distance is at least one of a lip thickness, a distance between a nose and a nose bridge, a distance between a lip and a nose bridge, a distance between a chin and a nose bridge, an eye length, and a distance between a jaw and a nose bridge of the three-dimensional mesh image and wherein the second anatomical distance is a distance between two anatomical positions on said three-dimensional mesh image. Still optionally, the first anatomical distance is a distance between two anatomical positions on said three-dimensional mesh image and the second anatomical distance is a distance between a point located proximate a left edge of a left eyebrow of the three-dimensional mesh image and a point located proximate a right edge of a right eyebrow of the three-dimensional mesh image.

In some embodiments, the computer-implemented method may process the two-dimensional image to validate a presence of a frontal image of the face prior to identifying the plurality of key points on the two-dimensional image of the face.

In some embodiments, the present specification discloses a computer readable non-transitory medium comprising a plurality of executable programmatic instructions wherein, when said plurality of executable programmatic instructions are executed by a processor, a process for increasing a dimensional depth of a two-dimensional image of a face to yield a face image that appears three dimensional is performed, said plurality of executable programmatic instructions comprising: programmatic instructions, stored in said computer readable non-transitory medium, for acquiring from the storage unit the two-dimensional image of the face; programmatic instructions, stored in said computer readable non-transitory medium, for acquiring from the storage unit a three-dimensional mesh image; programmatic instructions, stored in said computer readable non-transitory medium, for identifying a plurality of key points on the two-dimensional image of the face; programmatic instructions, stored in said computer readable non-transitory medium, for generating a texture map of the two-dimensional image of the face; programmatic instructions, stored in said computer readable non-transitory medium, for translating said texture map of the two-dimensional image of the face onto the three-dimensional mesh image; programmatic instructions, stored in said computer readable non-transitory medium, for determining a first set of one or more proportions within the two-dimensional image of the face; programmatic instructions, stored in said computer readable non-transitory medium, for determining a second set of one or more proportions within the three-dimensional mesh image; programmatic instructions, stored in said computer readable non-transitory medium, for determining a plurality of scaling factors, wherein each of said scaling factors is a function of one of said first set of one or more proportions and a corresponding one of said second set of one or more proportions; and programmatic instructions, stored in said computer readable non-transitory medium, for adjusting the three-dimensional mesh image based on the determined plurality of scaling factors to yield the face image that appears three dimensional.

Optionally, the key points include points representative of a plurality of anatomical locations on the face, wherein said anatomical locations include points located on the eyebrows, eyes, nose, and lips.

Optionally, the texture map comprises a plurality of non-overlapping, triangular regions.

Optionally, the determining one or more proportions within the two-dimensional image comprises determining proportions from measurements between at least two anatomical positions on the face.

Optionally, each of said plurality of scaling factors is a ratio of one of said first set of one or more proportions to the corresponding one of said second set of one or more proportions.

Optionally, the determining a first set of one or more proportions within the two-dimensional image comprises determining a first anatomical distance and dividing said first anatomical distance by a second anatomical distance.

Optionally, the first anatomical distance is at least one of a lateral face width, a lateral jaw width, a lateral temple width, a lateral eyebrow width, a lateral chin width, a lateral lip width, and a lateral nose width and wherein the second anatomical distance is a distance between two temples of the face.

Optionally, the first anatomical distance is at least one of a vertically defined lip thickness, a vertical distance between a nose and a nose bridge, a vertical distance between a lip and a nose bridge, a vertical distance between a chin and a nose bridge, a vertical eye length, and a vertical distance between a jaw and a nose bridge and wherein the second anatomical distance is a distance between two temples of the face.

Optionally, the first anatomical distance is a distance between two anatomical positions on said face and the second anatomical distance is a distance between a point located proximate a left edge of a left eyebrow of the face and a point located proximate a right edge of a right eyebrow of the face.

Optionally, the determining a second set of one or more proportions within the three-dimensional mesh image comprises determining a first anatomical distance and dividing said first anatomical distance by a second anatomical distance.

Optionally, the first anatomical distance is at least one of a lip thickness, a distance between a nose and a nose bridge, a distance between a lip and a nose bridge, a distance between a chin and a nose bridge, an eye length and a distance between a jaw and a nose bridge of the three-dimensional mesh image and wherein the second anatomical distance is a distance between two anatomical positions on said three-dimensional mesh image.

Optionally, the first anatomical distance is a distance between two anatomical positions on said three-dimensional mesh image and the second anatomical distance is a distance between a point located proximate a left edge of a left eyebrow of the three-dimensional mesh image and a point located proximate a right edge of a right eyebrow of the three-dimensional mesh image.

Optionally, the computer readable non-transitory medium further comprises programmatic instructions, stored in said computer readable non-transitory medium, for processing the two-dimensional image to validate a presence of a frontal image of the face prior to identifying the plurality of key points on the two-dimensional image of the face.

The aforementioned and other embodiments of the present invention shall be described in greater depth in the drawings and detailed description provided below.

BRIEF DESCRIPTION OF THE DRAWINGS

These and other features and advantages of the present invention will be appreciated, as they become better understood by reference to the following detailed description when considered in connection with the accompanying drawings, wherein.

DETAILED DESCRIPTION

Figure 1:
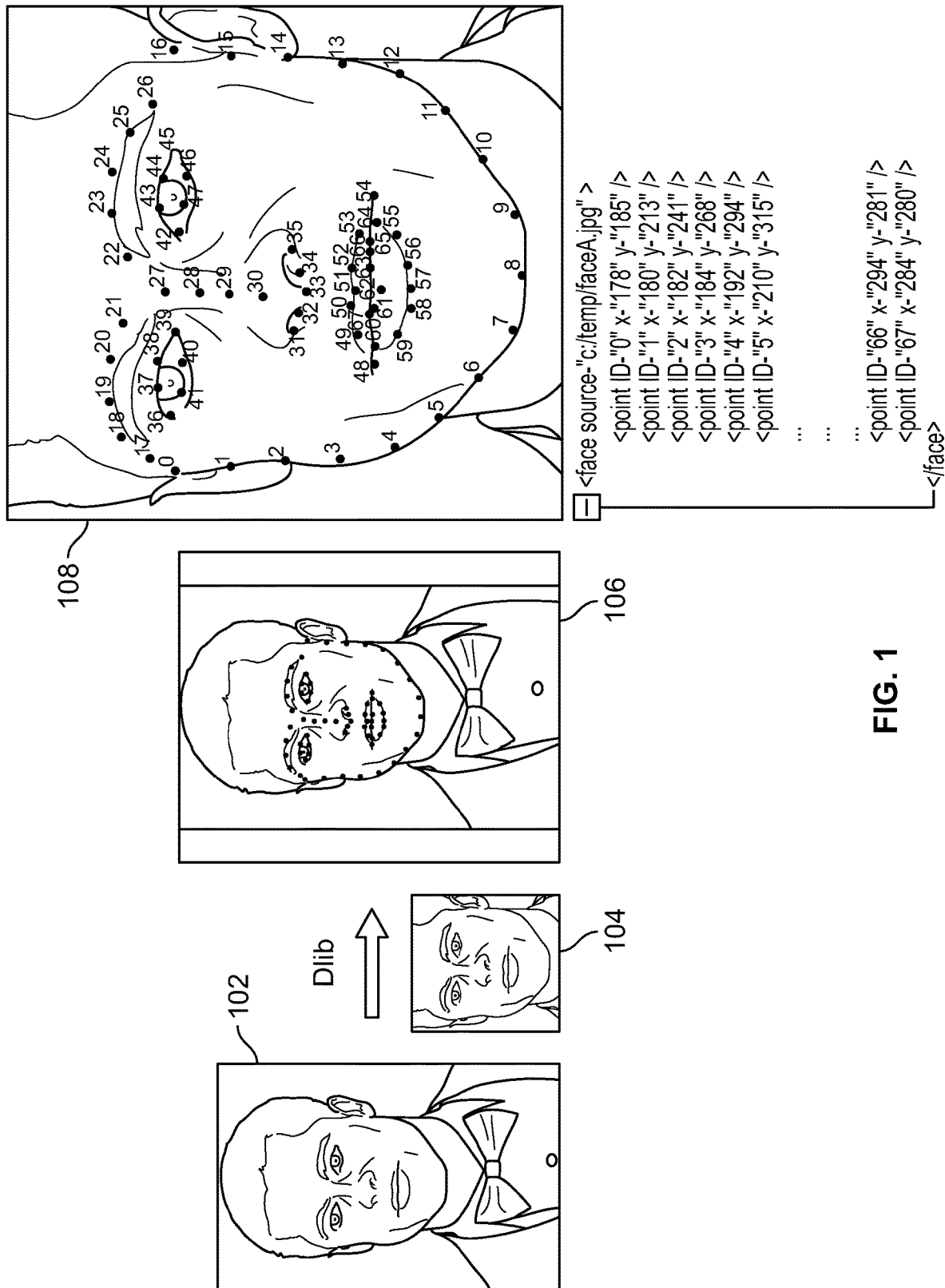
FIG. 1 illustrates the sequence of processing an image to identify a set of key points, in accordance with some embodiments of the present specification.

In an embodiment, a method is provided for converting a two-dimensional (2-D) image for three-dimensional (3-D) display using a computing device, such as a laptop, mobile phone, desktop, tablet computer, or gaming console, comprising a processor in data communication with a non-transient memory that stores a plurality of programmatic instructions which, when executed by the processor, perform the methods of the present invention. The 2-D image may be in any known format, including, but not limited to, ANI, ANIM, APNG, ART, BMP, BPG, BSAVE, CAL, CIN, CPC, CPT, DDS, DPX, ECW, EXR, FITS, FLIC, FLIF, FPX, GIF, HDRi, HEVC, ICER, ICNS, ICO/CUR, ICS, ILBM, JBIG, JBIG2, JNG, JPEG, JPEG 2000, JPEG-LS, JPEG XR, KRA, MNG, MIFF, NRRD, ORA, PAM, PBM/PGM/PPM/PNM, PCX, PGF, PlCtor, PNG, PSD/PSB, PSP, QTVR, RAS, RBE, SGI, TGA, TIFF, UFO/UFP, WBMP, WebP, XBM, XCF, XPM, XWD, CIFF, DNG, AI, CDR, CGM, DXF, EVA, EMF, Gerber, HVIF, IGES, PGML, SVG, VML, WMF, Xar, CDF, DjVu, EPS, PDF, PICT, PS, SWF, XAML and any other raster, raw, vector, compound, or other file format.

In embodiments, the conversion from a 2-D image to a modified image with increased dimensional depth to thereby appear to be 3-D, generally referred to as a 3-D image, is performed automatically after the 2-D image is obtained by the computing device. In an embodiment, a single 2-D image is processed to identify key points of interest. These points are used to define three-point regions that are exclusive of each other. In an embodiment, a Delaunay triangulation method is used to define the three-point regions automatically. The triangulation is used to synchronize with pre-indexed points of interest laid out on a 3-D model, thereby enabling a UV mapping of the 2-D image to yield a texturized 3-D model. In various embodiments, proportions and ratios that are unique to the 2-D image and the texturized 3-D model are used to calculate at least one scale factor. The scale factors are used to sculpt the 3-D image corresponding to the original 2-D image.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention. In the description and claims of the application, each of the words "comprise" "include" and "have", and forms thereof, are not necessarily limited to members in a list with which the words may be associated.

It should be noted herein that any feature or component described in association with a specific embodiment may be used and implemented with any other embodiment unless clearly indicated otherwise.

FIG. 1 illustrates the sequence of processing an image with a general purpose cross-platform software library that contains machine learning algorithms. Exemplary features in the software library enables the detection of face features, including eyebrows, eyes, nose, mouth, nostrils, ears, cheekbones, chin, and/or lips. It should be appreciated that any facial feature detection software may be implemented, provided the software detects more than one location on (and assigns a distinct point to more than one location) on each of the two eyebrows, two eyes, nose, and lips of the face and assigns each of those distinct points with a distinct horizontal position (e.g., X position) and vertical position (e.g., Y position) in a coordinate system.

Referring back to FIG. 1, a facial image 102 is processed using a software application. In various embodiments, the image 102 is sourced from a viewing element such as a camera, a database of images, a video, a memory local to the computing device, a memory remote from the computing device, or any other source of images. In one embodiment, the image 102 is a result of a selfie shot taken by an individual through a camera of a mobile phone and stored locally within the mobile phone. Processing validates that the image is a frontal image of a face. A frontal image of a face may be best suited in a display for gaming applications and several other virtual reality, augmented reality or mixed reality applications. The remaining components (body parts) of a display created for an individual may be created and presented in various imaginative formats.

Using facial feature detection software, the frontal face portion 104 may thus be isolated from the remaining image. Optionally, the facial image may be analysed to determine if the image is sufficiently "front-facing". More specifically, if the facial image is too skewed, whether up, down, diagonally, left, right, or otherwise, the presently disclosed methods and systems may have a difficult time generating a quality three dimensional image. As a result, in one embodiment, the presently disclosed system analyses the image to determine if the face is turned greater than a predefined angle, if the edges of the face are substantially the same distance from the center of the face, and/or if the features on one side of the face, such as lips, eyes or ears, are dimensionally different, in excess of a predefined threshold, relative to the features on the other side of the face.

If the facial image is sufficiently "front-facing", subsequently, the system identifies multiple key anatomical points, as seen in image 106, which indicate anatomically defined features of the face in image 102. A key anatomical point is a location on a face that is detected and provided by a software application. An exemplary software application uses a face detection function that returns a list of 67 points on the face (in pixels). In embodiments of the present specification, the system numbers key points in image 106, as seen in image 108. Image 108 illustrates key points indexed up to 67 and the numbers shown in image 108 indicate an assigned identity (ID) of each key point. It should be appreciated that the system may identify any number of anatomical points that may be less than or greater than 67.

Figure 2:
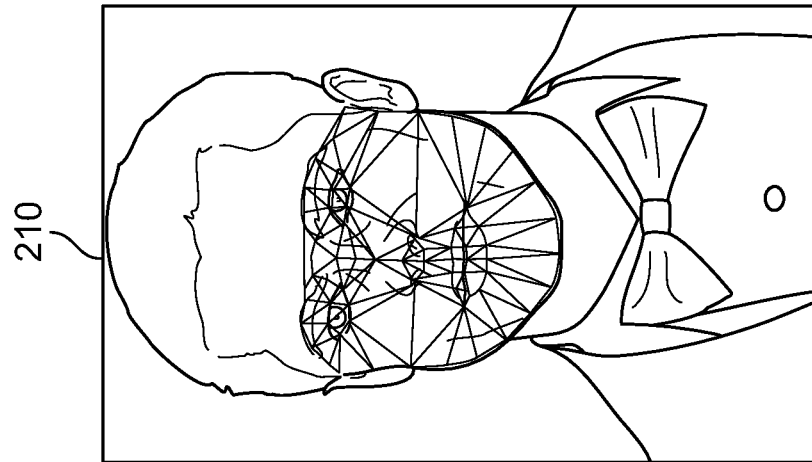
FIG. 2 illustrates a first step, where an image with multiple key points is used to define non-overlapping, three-point regions, in accordance with some embodiments of the present specification.
Figure 2:
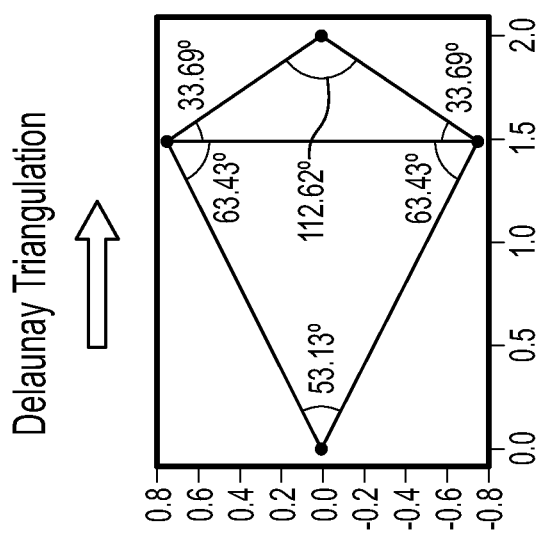
Figure 2:
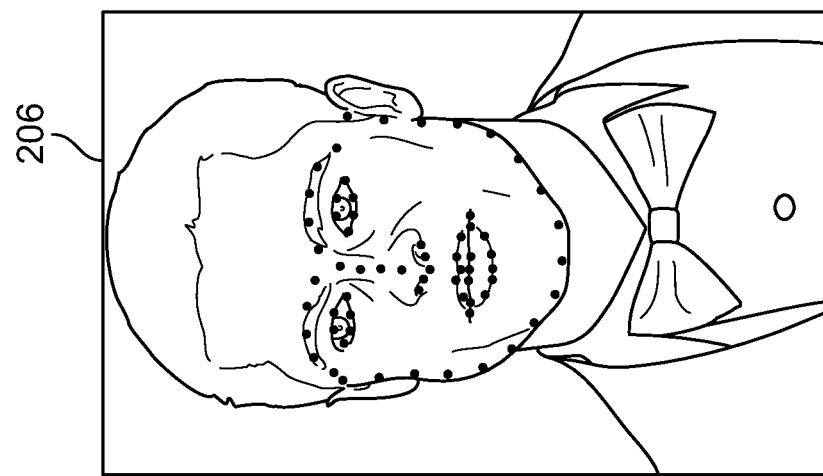

Subsequently, the system generates a texture map for image 106. The system generates a texture map using two steps. FIG. 2 illustrates a first step, where an image 206 with multiple key points is used to define a plurality of non-overlapping regions, each of which may be defined by at least three points, as seen in image 210. In an embodiment, the regions define various anatomical regions, thereby capturing various anatomical features, of a front-face of a human being. In an embodiment, at least the anatomical regions that define brows, eyes, nose, lips, and face, are covered by the key points. In embodiments, the non-overlapping, three point, triangular regions are defined using Delaunay triangulation, automatically through the execution of programmatic instructions on the computing device. Use of Delaunay triangulation, which is a known analytical method to persons of ordinary skill in the art, ensures that none of the key points are inside the circumcircle of any triangular region, thus maximizing the minimum angle of all the angles of the triangles in the triangulation. Maximizing the minimum angles thereby improves subsequent interpolation or rasterization processes that may be applied to the image for creating a corresponding 3-D mesh.

Figure 3:
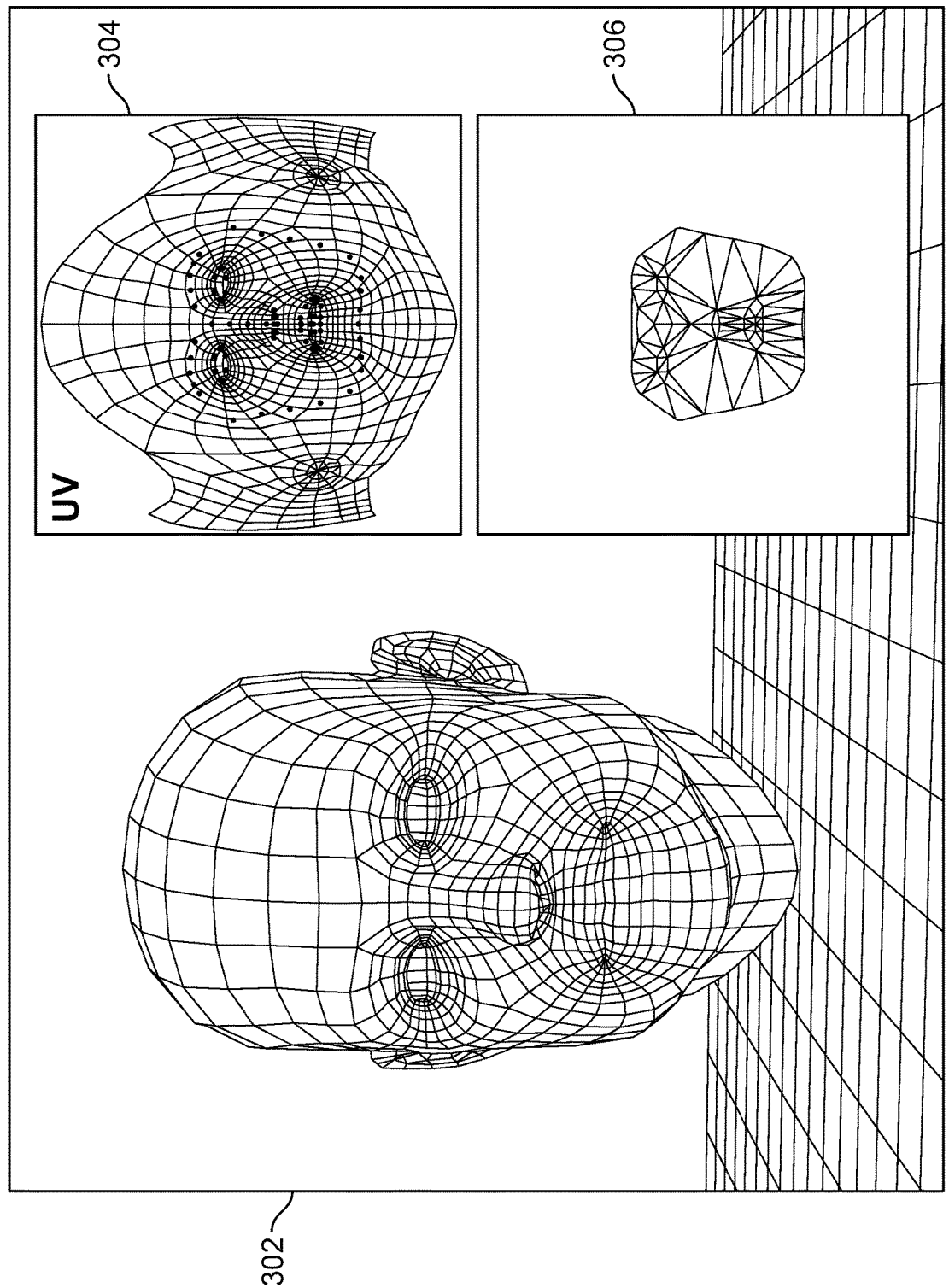
FIG. 3 illustrates a step where a texture map is obtained for a 3-D model, in accordance with some embodiments of the present specification.

Referring to FIG. 3, the system then initiates a process of generating a texture map for a 3-D model. Triangulation from the previous step is automatically used to synchronize a plurality of pre-defined and/or pre-indexed points of interest identified on a UV layout. In an alternative embodiment, the points of interest are automatically generated by the system. In embodiments, the points of interest identified for the UV layout are termed as landmark points of UV map. A UV layout is a layout of a 2D model where U and V refer to the two axes (corresponding to X and Y axes in the 3D model). In embodiments, the system stores, in a memory, a generic 2D UV layout and its corresponding generic 3D model. The system uses the triangulation data to modify the generic UV layout and uses the modified UV layout to create a modified 3D model.

In FIG. 3, an image 302 illustrates a pre-defined or automatically generated generic 3-D mesh model. An image 304 illustrates the texture coordinates or the landmark points on the UV map of the generic 3-D mesh model. The texture coordinates or landmark points are generated for each vertex of the triangles derived through the triangulation. In embodiments, image 304 is generated automatically by a software application. Image 306 illustrates the triangles derived through the triangulation process for the UV map of the generic 3D model.

Figure 4:
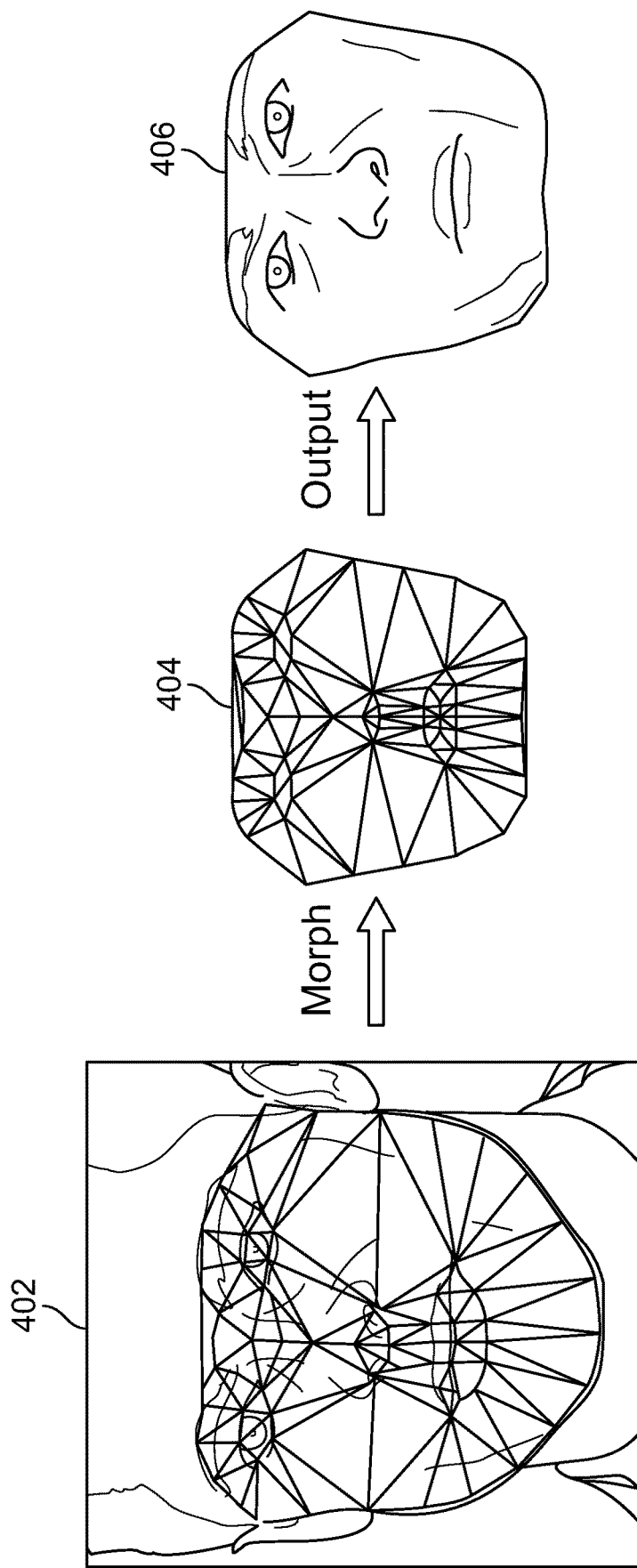
FIG. 4 illustrates processing of the images to arrive at an image, which is a texture map of the 3-D model created using triangulation of the key points, in accordance with some embodiments of the present specification.

FIG. 4 illustrates processing of the images to arrive at an image 406, which is a texture map of the 3-D model. The figure shows an image 402 corresponding to the original image 104, with triangulations of the key points. Images 402 of FIG. 4 and 210 of FIG. 2 illustrate a resulting collection of tri-faces within the original image 104. The system matches the tri-faces of image 402 with corresponding triangles within the UV map 404 of the generic 3-D mesh model. In an embodiment, this is achieved by matching each key point of the original image with the texture coordinates or landmark points of the UV map. Thus, the system uses the key points to morph the generic UV layout such that the UV layout is modified in to a front-face image 406, which includes the texture of the original image of the face. The texture includes colors and other visual parameters, such as hue, luminance, brilliance, contrast, brightness, exposure, highlights, shadows, black point, saturation, intensity, tone, grain, neutrals; which are automatically sampled from various parts of the face in the original image and averaged, or subjected to some other processing formula, to fill out the backdrop within the morphed 3-D mesh image. The resultant image may be used as a texture map for the 3D model.

Various embodiments of the present specification enable accounting for the unique proportions and ratios of the original image. In the given example, the original image 104 used for processing a frontal face of an individual, is additionally used to identify face feature lengths, distances, proportions, dimensions, or ratios, collectively referred to as positional relationships. In embodiments, the system analyses image 104 to generate values indicative of the positional relationships of an individual's facial features. For example, the values may be representative of the relative distances between width of the nose compared to the chin, distance between the two eyes, width of eyebrows, thickness of the lips, and other measurements that mark the positional relationships of various anatomical points and/or regions on the face.

Figure 5:
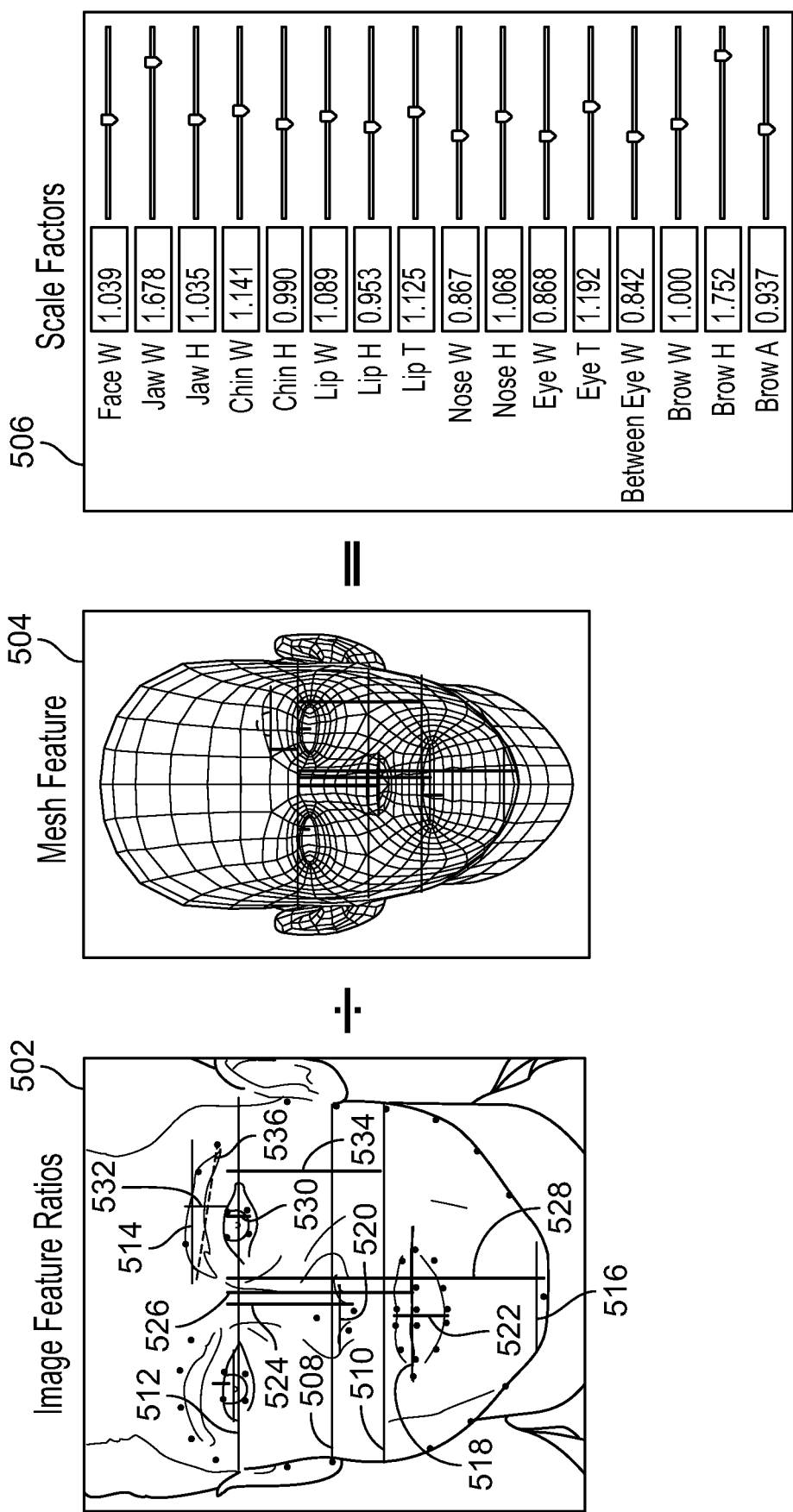
FIG. 5 illustrates various horizontal (green lines) and vertical (red lines) measurements with the original image that may be used in accordance with some embodiments of the present specification.

In an embodiment, the system determines a plurality of distances between various anatomical facial features. In embodiments, the distances are used to adjust the generated 3D model of the original image of the face. Referring to FIG. 5, image 502 illustrates various horizontal (green lines) and vertical (red lines) measurements with the original image (104) that may be used in accordance with some embodiments of the present specification, to identify the positional relationships. Image 504 illustrates various measurements of similar features of the generic 3-D mesh model face (image 302 of FIG. 3).

Figure 5B:
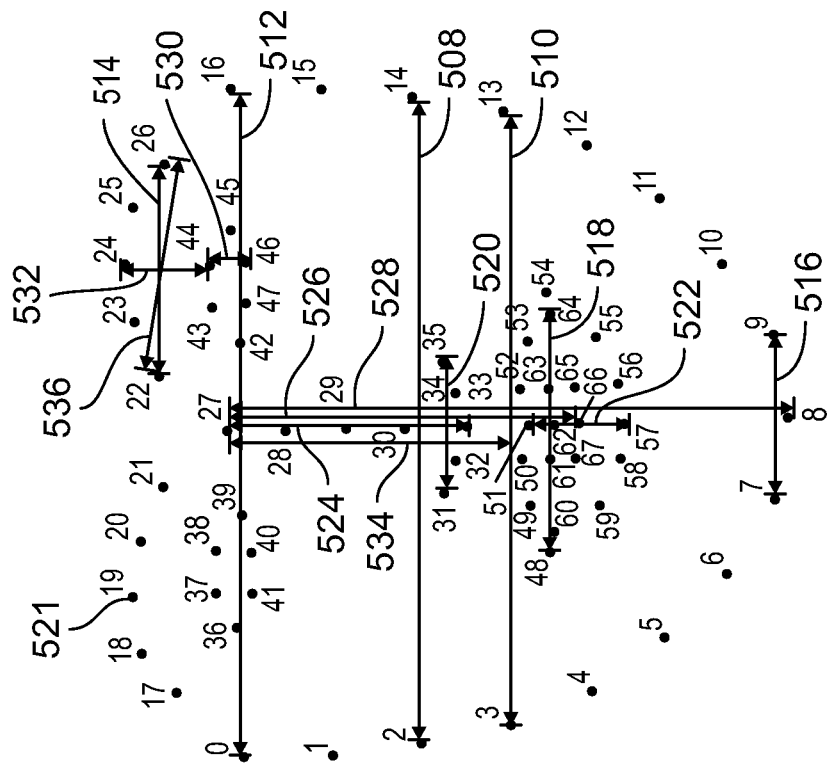
FIG. 5B illustrates the various key points of FIG. 5A without the exemplary face, in accordance with some embodiments of the present specification.
Figure 5A:
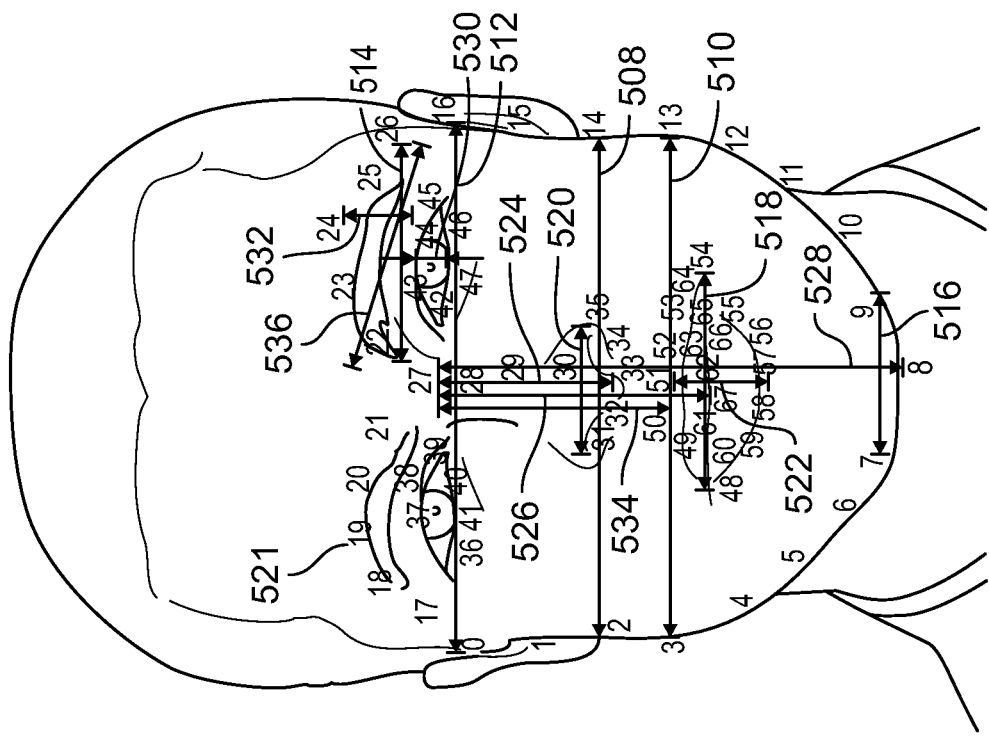
FIG. 5A illustrates a placement of various key points on an exemplary face, in accordance with some embodiments of the present specification.

FIGS. 5A and 5B show an enlarged view of key points 1 to 67 521, identified through a plurality of programmatic instructions configured to graphically identify a plurality of key points. The number IDs for the key points 521 shown in FIGS. 5A and 5B are recalled (in brackets) in the following examples. The system uses the corresponding similar measurements to derive positional relationships between the measured features. One of the plurality of exemplary distances is a face width, defined as a distance 508 (2 and 14) from one point located proximate the left edge of the face laterally across the face to a point located proximate on the right edge of the face. Another of the plurality of exemplary distances is a jaw width, defined as a distance 510 (3 and 13) from one point located proximate the left edge of the jaw laterally across the face to a point located proximate on the right edge of the jaw. Yet another of the plurality of exemplary distances is a temple width, defined as a distance 512 (0 and 16) from one point located proximate the left edge of the temple laterally across the face and through the eyes, to a point located proximate on the right edge of the temple. Still another of the plurality of exemplary distances is an eyebrow width, defined as a distance 514 (22 and 26) from one point located proximate the left edge of an eyebrow, laterally across the width of the eyebrow, to a point located in line with the right edge of the same eyebrow. Another of the plurality of exemplary distances is a chin width, defined as a distance 516 (7 and 9) from one point located proximate the left edge of the chin laterally across the chin, to a point located proximate on the right edge of the chin. Another of the plurality of exemplary distances is a lip width, defined as a distance 518 (48 and 64) from one point located proximate the left corner of the lips where the upper and the lower lip meet, across the mouth, to a point located proximate on the right corner of the lips. Another of the plurality of exemplary distances is a nose width, defined as a distance 520 (31 and 35) from one point located proximate the left edge of the left opening of the nose, to a point located proximate on the right edge of the right opening of the nose. In embodiments, additional and/or other combinations of horizontal distances between various anatomical points mapped laterally across the face are used to obtain the positional relationships.

Distances may also be measured vertically across the length of the face. One of the plurality of exemplary distances is a lip thickness, defined as a distance 522 (51 and 57) from one point located proximate the centre of a top edge of an upper lip, vertically across the mouth, to a point located proximate the centre of a bottom edge of a lower lip. Another one of the plurality of exemplary distances is a distance between nose and nose bridge, defined as a distance 524 (27 and 33) from one point located proximate the centre of the eyes where the top of a nose bridge is positioned, vertically across the nose, to a point located proximate the centre of the nose openings. Yet another of the plurality of exemplary distances is a distance between lip and nose bridge, defined as a distance 526 (27 and 66) from one point located proximate the centre of the eyes where the top of a nose bridge is positioned, vertically across the nose and the upper lip, to a point located proximate the center of the mouth. Still another of the plurality of exemplary distances is a distance between chin and nose bridge, defined as a distance 528 (27 and 8) from one point located proximate the centre of the eyes where the top of a nose bridge is positioned, vertically across the nose, the upper lip, and the mouth, to a point located proximate the centre of the chin. Another of the plurality of exemplary distances is an eye length, defined as a distance 530 (44 and 46) from one point located proximate the centre of a top of an eye, vertically across the eye, to a point located proximate the centre of a bottom of the eye. Another of the plurality of exemplary distances is an eyebrow height, defined as a distance 532 (24 and 44) from one point located proximate the centre of the eyebrow, vertically across the eye, to a point located proximate the centre of the eye under the eyebrow. Another of the plurality of exemplary distances is a jaw and nose bridge distance, defined as a distance 534 (27 and 3) from one point located proximate the centre of the nose bridge, vertically across the length of the cheek, to a point located proximate the jaw. In embodiments, additional and/or other combinations of vertical distances between various anatomical points mapped vertically across the face are used to obtain the positional relationships.

In embodiments, additional and/or other combinations of diagonal distances between various anatomical points mapped laterally across the face are used to obtain the positional relationships. An example is a distance 536 (22 and 26) between a point located proximate the left edge of one eyebrow to the right edge of the same eyebrow, which indicates the brow angle.

In embodiments, the system obtains positional relationships in image 502 by determining one or more proportions, based on the one or more of lateral, vertical, and diagonal distances. In an exemplary embodiment, face width 508, measured between key points with IDs 2 and 14, is used as a constant to determine proportions of other measured distances. For example, one of the plurality of proportions is derived by using distance 510 (3 and 13) as the numerator and face width 508 as the denominator. The exemplary proportion described here provides the positional relationship of the jaw with respect to the face. In an alternative embodiment, the system uses distance 512 between key points with ID 0 and with ID 16, which may indicate the entire temple width of the facial image, as a whole unit in the denominator to subsequently calculate ratios on all the rest of the face. While other anatomical distances may be used as the denominator to calculate one or more proportions, temple width is the preferred distance because it tends to remain predictably static, even if people gain weight, lose weight, age, or undergo collagen or botox injections.

In embodiments, similar proportions are determined for the 3-D mesh model image 504. As described above in relation to image 502, the system obtains positional relationships in image 504 by determining one or more proportions, based on the one or more of lateral, vertical, and diagonal distances in relation to a standard anatomical distance, such as temple width.

Once both sets of proportions are obtained, the system uses proportions from both images 502 and 504 to calculate their ratio, in order to determine scale factors 506. In an embodiment, scale factor 506 is the ratio of proportions or positional relationships of image 502, to the corresponding proportions or positional relationships of image 504. Image 506 illustrates exemplary scale factors derived using corresponding proportions from the image of the face of an individual 502 and the generic 3-D mesh model 504.

Figure 6:
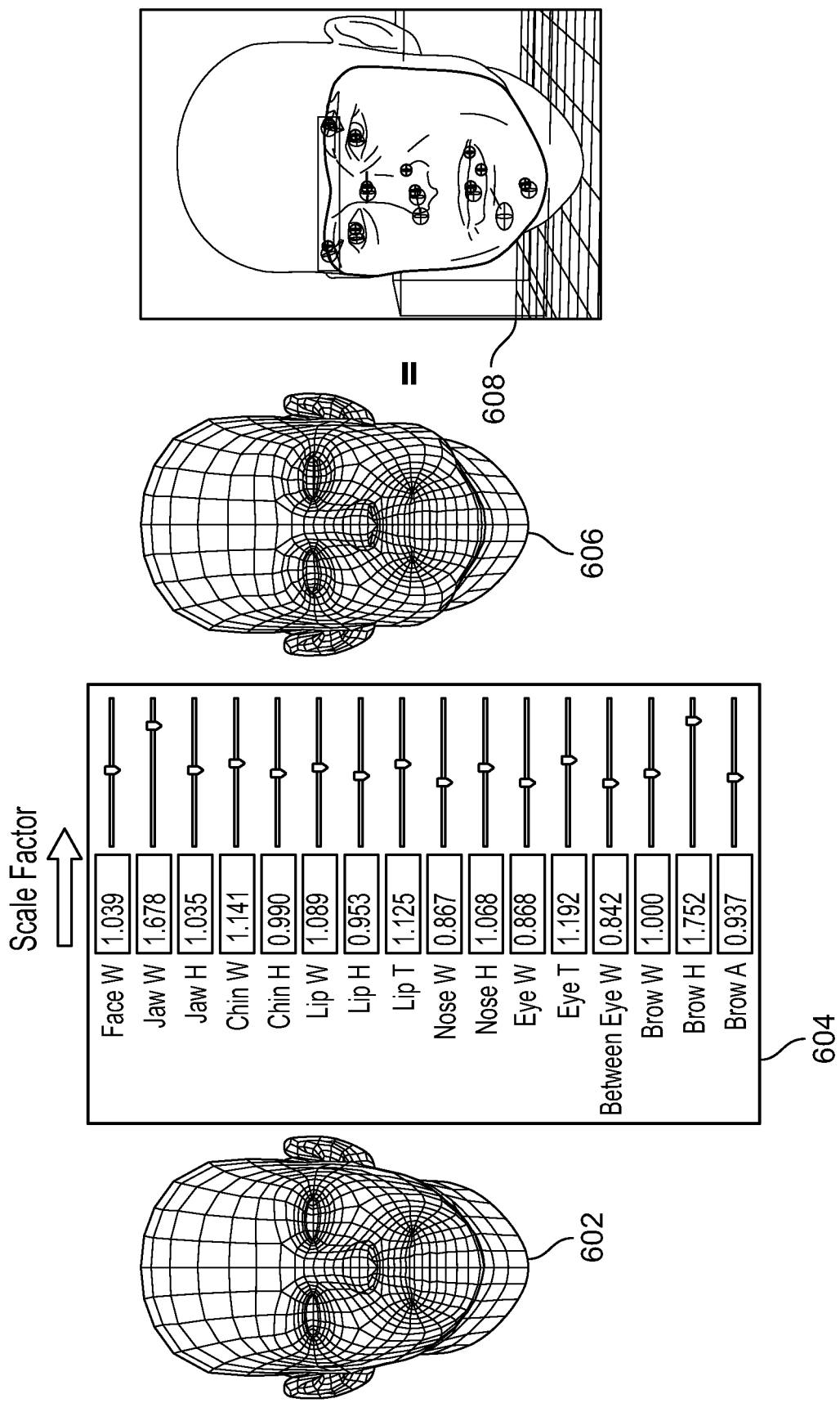
FIG. 6 illustrates a generic 3-D mesh model, to which scale factors are applied, in order to obtain a modified 3-D mesh model, in accordance with some embodiments of the present specification.

In an embodiment, these measurements are communicated to a console of a computing and/or a mobile computing device, along with the newly generated texture map 406. FIG. 6 illustrates a generic 3-D mesh model 602 504, 302 to which the system applies the scale factors 604, 506, in order to obtain a modified 3-D mesh model 606. In embodiments, the texture map 406 obtained previously is applied to modified 3-D mesh model 606, to obtain a final 3-D model 608 of the original 2-D image. On the console side, the 3-D model's texture is swapped out with the newly created model 606, and the proportion measurements are used to drive adjustments to mirror the individual's actual face structure. This, in effect, sculpts the mesh to more closely resemble the captured face.

Figure 7:
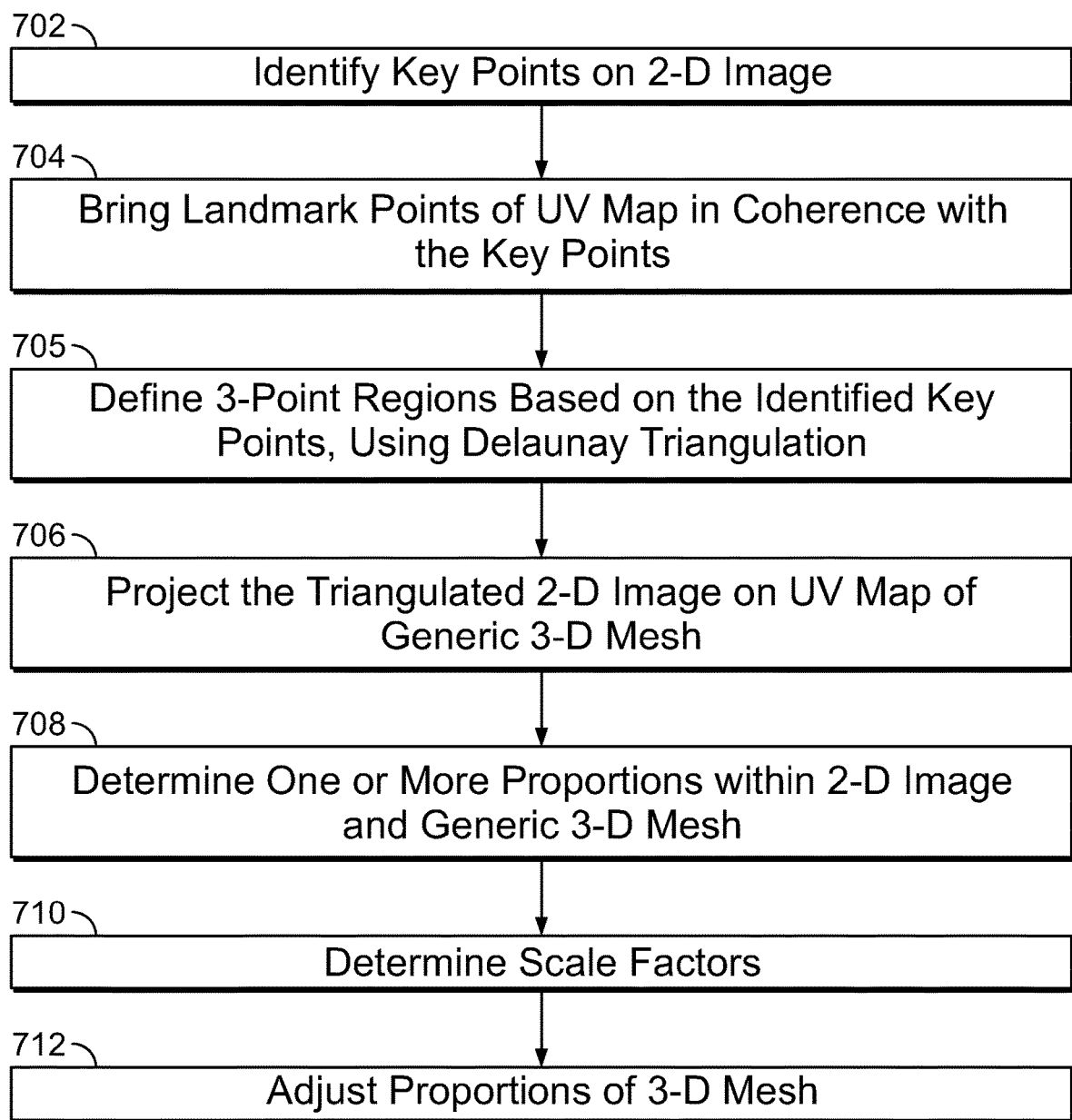
FIG. 7 is a flow chart illustrating an exemplary computer-implemented method to convert a 2-D image in to a 3-D image for display, in accordance with embodiments of the present specification.

FIG. 7 is a flow chart illustrating an exemplary computer-implemented method to convert a 2-D image into a modified image that has increased dimensional depth (and, therefore, appears three dimensional to a user) for display, in accordance with embodiments of the present specification. At 702, the system, according to various embodiments of the present specification, identifies key points on the 2-D image. In an embodiment, the system uses a plurality of programmatic instructions designed to graphically identify a plurality of key points, to identify at least 67 key points. Subsequently the system derives a texture map for the 2-D image. The system derives a texture map using the following steps. First, at 704, the system identifies a plurality of non-overlapping, three-point regions based on the identified key points. In embodiments, a set of pre-defined landmark points of UV map of a generic 3-D mesh 304 are brought in coherence with the key points on the 2-D image 206. Preferably, the landmark points of UV map of the generic 3-D mesh are generated automatically. At 705, the system uses Delaunay triangulation to define the three-point regions, based on the identified key points. The three-point regions, which may also be termed as pieces of tri-faces, represent an average texture of the face within each region. Each vertex of the triangles are the UV coordinates (also known as texture coordinates), which are used to recreate the texture of the 2D image on a 3D model. At 706, the system projects the triangulated 2-D image on UV map of the generic 3-D mesh model 304.

At 708, the system determines one or more positional relationships within the 2-D image. As described above, the positional relationships comprise a plurality of distances between anatomical features in the facial image, and ratios of those distances to a specific anatomical distance such as temple width, which are necessarily unique to the 2-D image. Similarly, the system determines one or more positional relationships within the generic 3-D mesh model of a face. As described above, the positional relationships comprise a plurality of proportions that are standard for a generic 3-D face model and comprise a plurality of distances between anatomical features in the 3-D face model, and ratios of those distances to a specific anatomical distance such as temple width, which define the generic 3-D face model.

At 710, the system then uses proportions for the 2-D image and the generic 3-D image to determine a ratio, which may be termed as the 'scale factor'. In one embodiment, each scale factor is calculated by taking a proportion for the 2-D image and dividing it by a proportion of the same anatomical features for the 3-D face model. In another embodiment, each scale factor is calculated by any function of a proportion for the 2-D image and a proportion of the same anatomical features for the 3-D face model. It should be appreciated that the aforementioned proportions, for either the 2-D image or 3-D face model, can be determined by taking a distance defining any of the following anatomical features and dividing it by a distance defining a temple width: a distance defining lip thickness, a distance between the nose and nose bridge, a distance between a lip and nose bridge, a distance between chin and nose bridge, a distance defining an eye length, a distance defining an eyebrow height, and a distance between a jaw and nose bridge distance.

The illustrations of FIG. 1 to FIG. 6 demonstrate the method of FIG. 7 implemented on the image of a face. In the exemplary embodiment, proportions may be determined from measurements between at least two anatomical positions on the face. The anatomical positions may include anatomical points and/or regions on the face such as but not limited to the jaw, the nose bridge, the chin, the lip, the eyes, the eyebrow, and other anatomical regions on the face, as described above. At 712, the system adjusts proportions of the 3-D mesh model that contains the texture created till step 706. The proportions are adjusted on the basis of the scale factor determined at step 710, in order to create the 3-D display for the original 2-D image.

Applications

Figure 8:
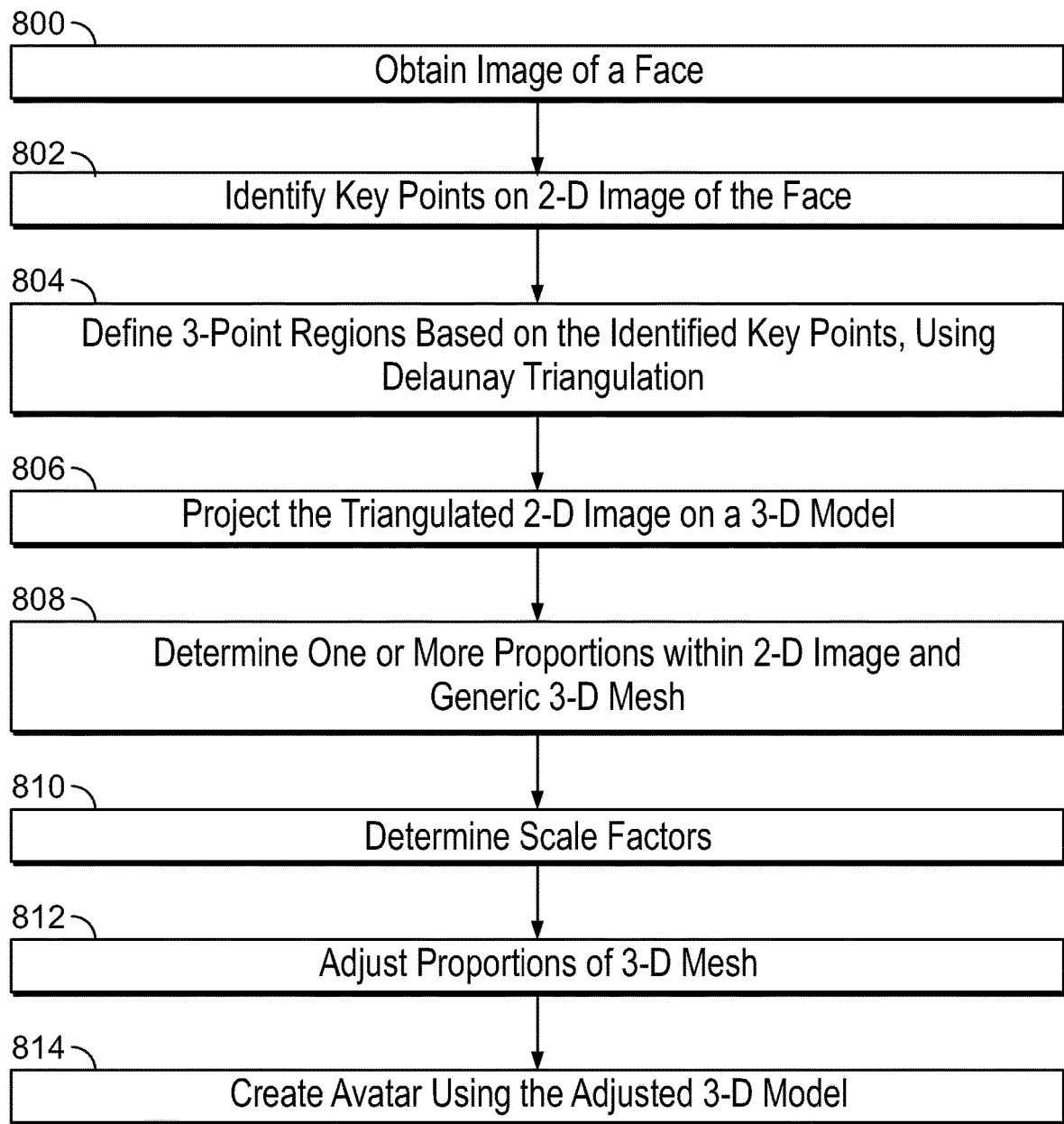
FIG. 8 is a flow chart illustrating an exemplary computer-implemented method to convert a 2-D image in to a 3-D image for display as an avatar, in accordance with embodiments of the present specification.

FIG. 8 is a flow chart illustrating an exemplary computer-implemented method to convert a 2-D image into a modified image that has increased dimensional depth (and, therefore, appears three dimensional to a user) for display as an avatar, in accordance with embodiments of the present specification. In embodiments, an avatar of an individual is recreated in 3-D virtual reality, augmented reality, or mixed reality environment, such as but not limited to gaming environments. In this case, a 2-D frontal face image of the individual is used to create a replica of at least the face in 3-D. The method is similar to the process described in FIG. 7.

At 800, the system obtains an image of the individual from one of the sources including, but not limited to, an independent camera, a camera integrated with a mobile or any other computing device, or an image gallery accessible through a mobile or any other computing device.

At 802, the system, according to various embodiments of the present specification, identifies key points on the 2-D image. In an embodiment, the system uses a plurality of programmatic instructions designed to graphically identify a plurality of key points, to identify at least 67 key points. Subsequently the system derives a texture map for the 2-D image. The system derives a texture map using the following steps. At 804, the system identifies a plurality of non-overlapping, three-point regions based on the identified key points. The system uses Delaunay triangulation to define the three-point regions, based on the identified key points, as described above. At 806, the system projects the triangulated 2-D image on UV map of the generic 3-D mesh model. At 808, the system determines one or more positional relationships within the 2-D image. As described above, the positional relationships comprise a plurality of distances between anatomical features in the facial image, and ratios of those distances to a specific anatomical distance such as temple width, which are necessarily unique to the 2-D image. Similarly, the system determines one or more positional relationships within the generic 3-D mesh model of a face. As described above, the positional relationships comprise a plurality of proportions that are standard for a generic 3-D face model and comprise a plurality of distances between anatomical features in the 3-D face model, and ratios of those distances to a specific anatomical distance such as temple width, which define the generic 3-D face model.

Figure 9:
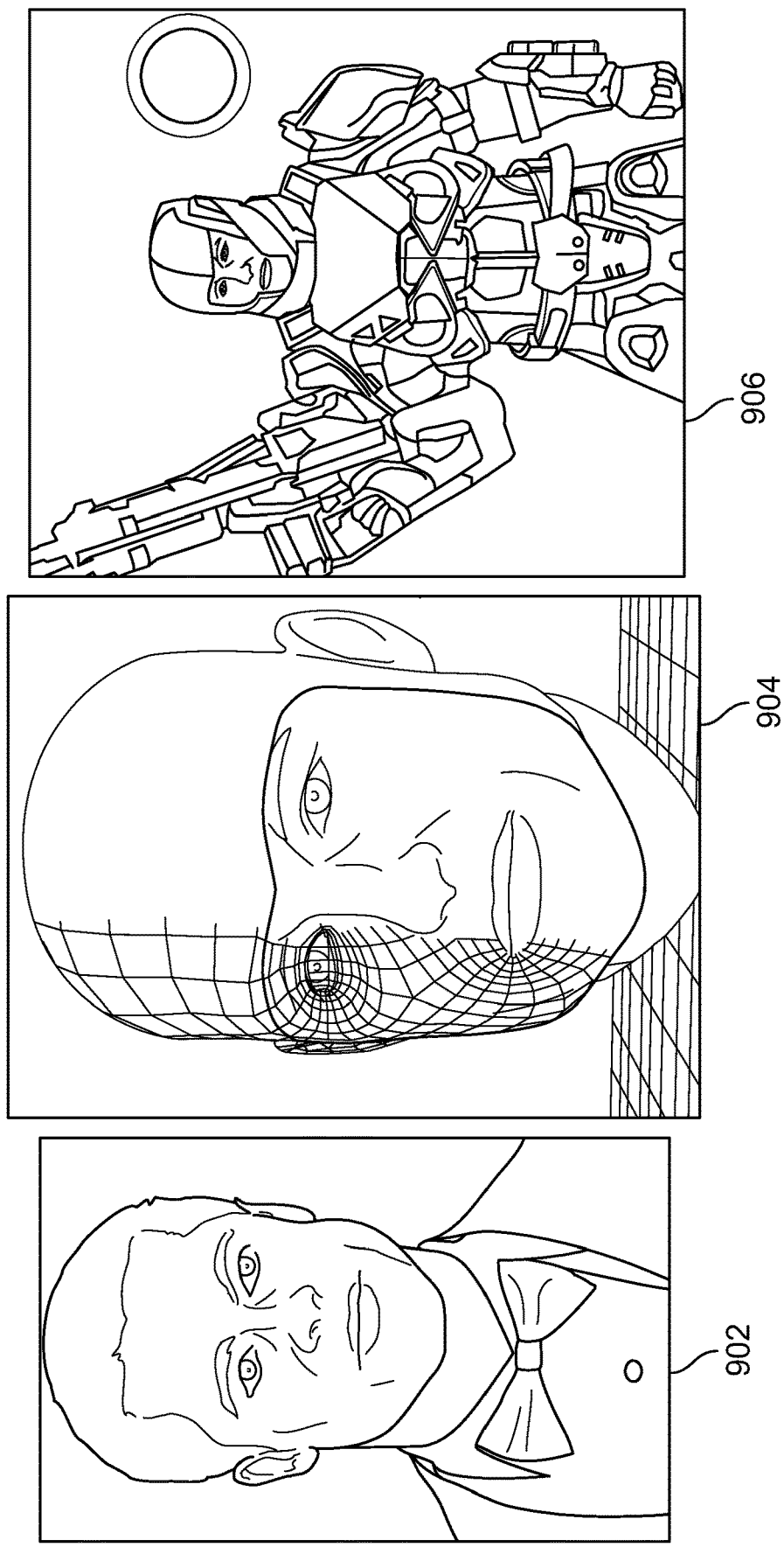
FIG. 9 illustrates a set of images that describe the conversion of a 2-D frontal face image to a 3-D avatar, in accordance with some embodiments of the present specification.

At 810, the system then uses proportions for the 2-D image and the corresponding proportions from the generic 3-D image to determine the scaling factors. At 812, the system adjusts the 3-D model based on the determined scaling factors and at 812, the system creates an avatar using the 3-D display of the face. The avatar may be used in various applications, such as gaming applications. FIG. 9 illustrates a set of images that describe the conversion of a 2-D frontal face image 902 to a 3-D avatar 906, in accordance with some embodiments of the present specification. An image 904 indicates the conversion of image 902 to a corresponding 3-D image (904). In embodiments, image 904 is further used by computer systems to create an avatar, for example avatar 906.

Figure 10:
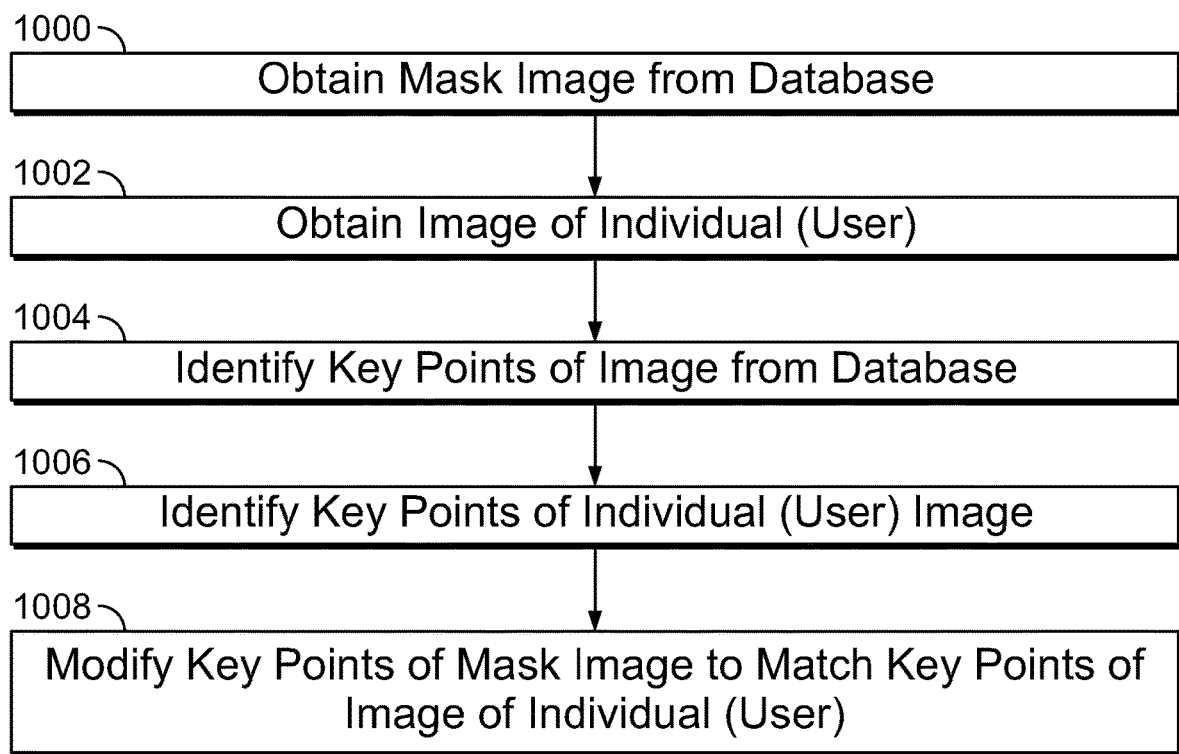
FIG. 10 is a flow chart illustrating an exemplary computer-implemented method to convert a 2-D image in to a 3-D image for display using AR masks, in accordance with embodiments of the present specification.

FIG. 10 is a flow chart illustrating an exemplary computer-implemented method to convert a 2-D image into a modified image that has increased dimensional depth (and, therefore, appears three dimensional to a user) for display using AR masks, in accordance with embodiments of the present specification. In embodiments, the masks are animated masks, or masks created from alternate images. In embodiments, a mask for an individual is recreated in 3-D virtual reality, augmented reality or mixed reality environments, such as but not limited to online, chatting and gaming environments. In embodiments, the mask is for the face of an individual and can track the individual's face in real time, thereby functioning with the changing facial expressions of the individual. In embodiments, the mask could be controlled by the individual's facial features. In this case, a 2-D frontal face image of the individual is used to create a replica of at least the face, in 3-D. At 1000, the system obtains an image from a database of images. In embodiments, the selected image is an image of a face, an animated character, or a facial expression created using animation or special effects. In embodiments, the image is obtained from a database of images, a video, a memory local to the computing device, a memory remote from the computing device, or any other source of images. The image obtained at this step is subsequently used as a mask, for example an AR mask, which can be applied to the face of the individual (user). At 1002, the system obtains an image of the individual (user) from one of the sources including, but not limited to, an independent video camera, or a video camera integrated with a mobile or any other computing device. In an embodiment, the image of the individual is obtained from a webcam. At 1004, key points on the 2-D image obtained at step 1000 are identified. At 1006, key points on the 2-D image of the individual (user) obtained at step 1002, are identified.

At 1008, the system modifies the key points on the 2-D image to be used as a mask, based on the key points identified for the 2-D image of the individual (user). The positioning of key points of the mask image are modified to match the positioning of key points of the individual's image. The modified image of the mask is then applied by the system on the image of the face of the individual. In another embodiment, the front-face image of the individual, comprised within the key points, are replaced by the modified mask-image.

The system is therefore capable of rapidly generating a masked image of a 2-D face. In this embodiment, AR masks are created for each consecutive frame, or each frame after a pre-defined number of frames, obtained from a video captured through a camera or taken from a video gallery. In an embodiment, the system uses a combination of programmatic instructions to identify frames from a video and use them to process according to the steps described above in context of FIG. 10. In the embodiment, AR masks are created on a frame by frame basis, thereby allowing for the generation of a plurality of facial images, each corresponding to one of the frames. In various embodiments, the system can superimpose any other image, such as glasses, hats, crazy eyes, facial hair, on each image, thereby creating a video feed with AR.

Figure 11:
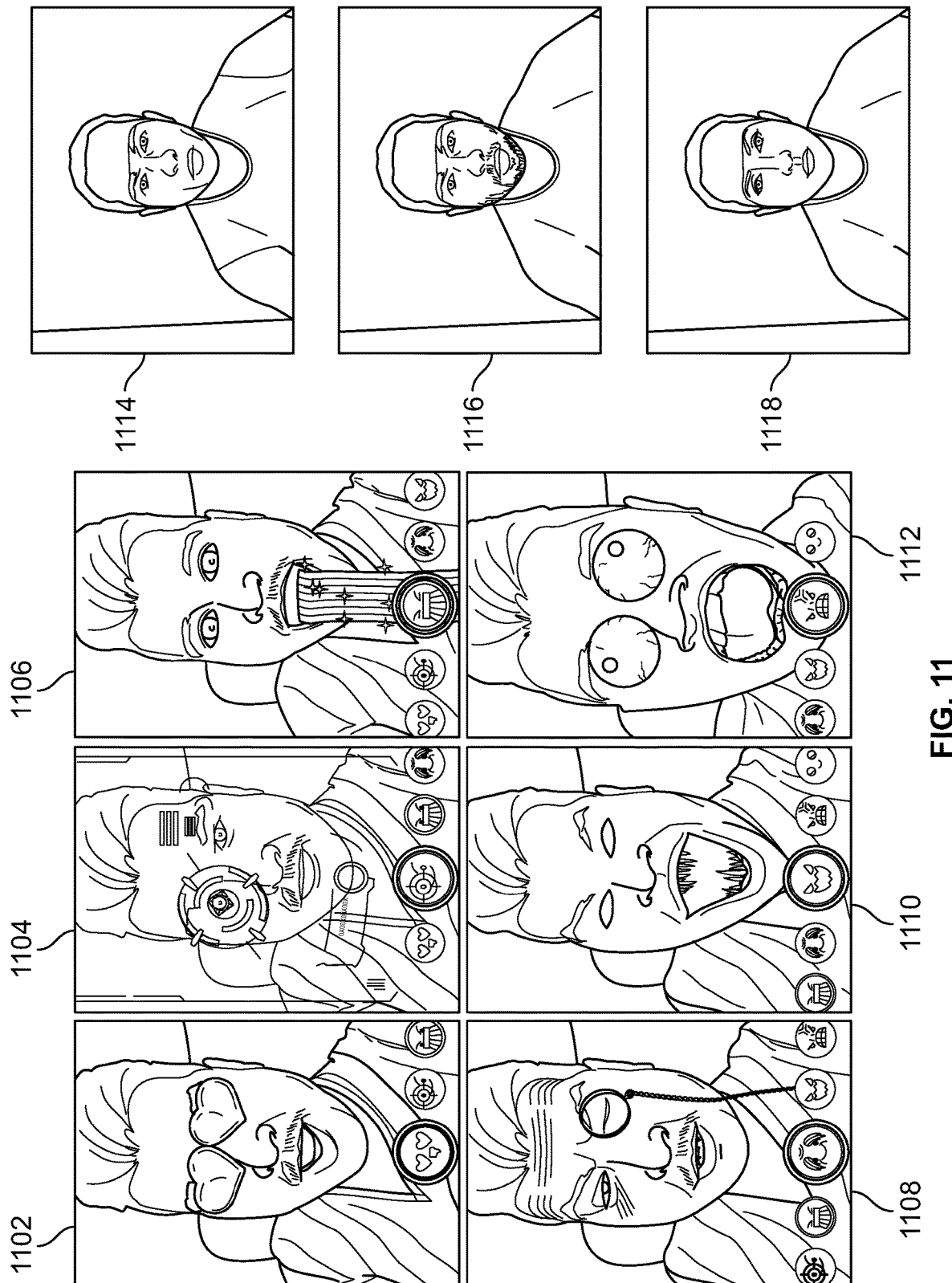
FIG. 11 illustrates multiple AR images, created with the method outlined with reference to FIG. 10, in accordance with some embodiments of the present specification.

FIG. 11 illustrates multiple AR images 1102, 1104, 1106, 1108, 1110, 1112, 1114, 1116, and 1118, created with the method outlined with reference to FIG. 10. Heart-shaped figures overlay eyes of a user, as seen in image 1102. In an embodiment, the heart-shaped figures may shrink each time the user blinks, and expand when the user has open eyes. As shown in image 1106, an AR image of a rainbow-like vomit falls out of the user's mouth each time the user opens the mouth. Images 1114 to 1118 illustrate face of the user that has been augmented by faces of different individuals. In embodiments, the faces of different individuals may be sourced from one or more digital databases.

Figure 12:
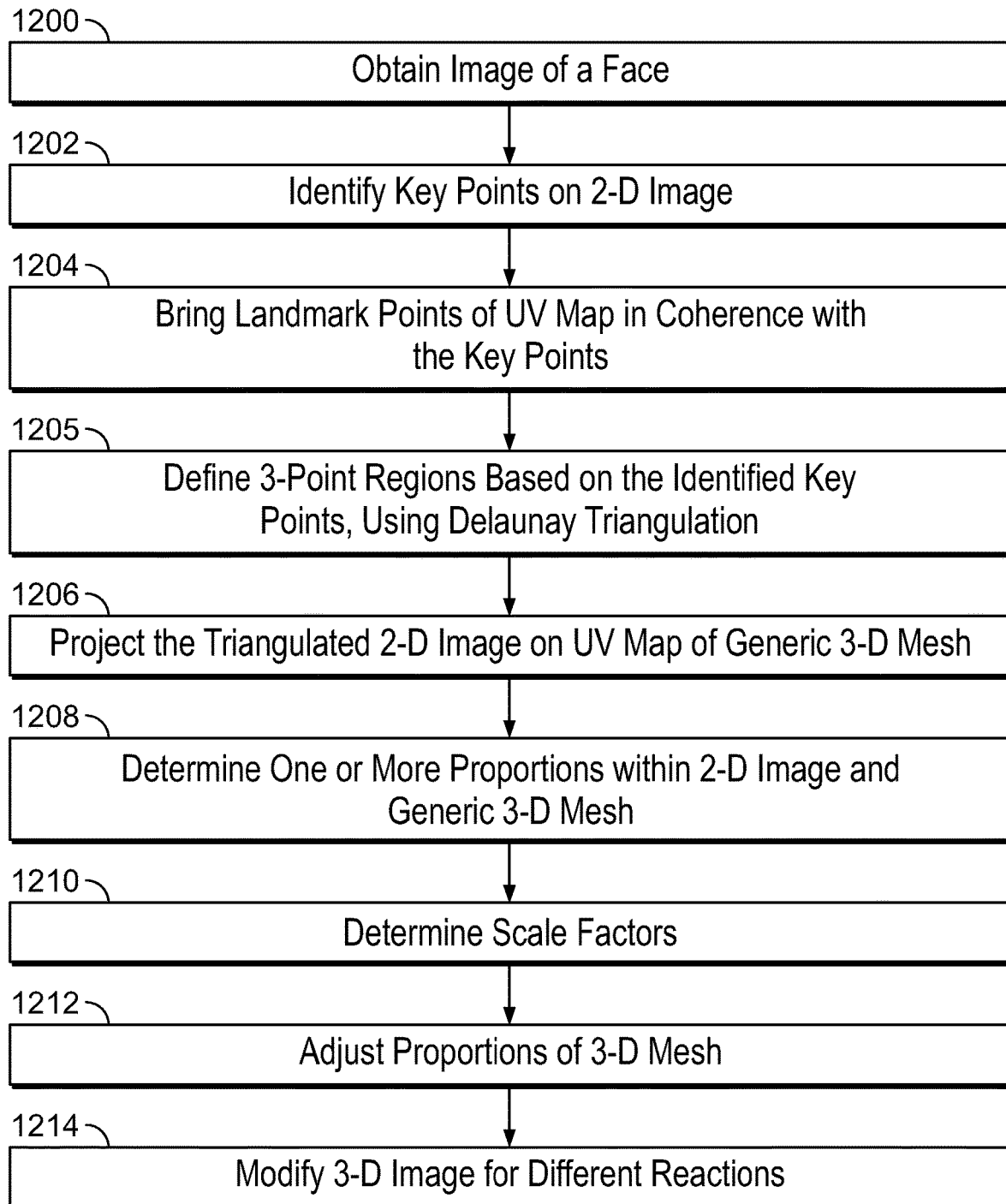
FIG. 12 is a flow chart illustrating an exemplary computer-implemented method to convert a 2-D image in to a 3-D image for display of faceless gaming and other interactive display characters, which are controlled by real individuals, in accordance with some embodiments of the present specification.

FIG. 12 is a flow chart illustrating an exemplary computer-implemented method to convert a 2-D image into a modified image that has increased dimensional depth (and, therefore, appears three dimensional to a user) for display of faceless gaming and other interactive display characters, which are controlled by real individuals. These may include users of Heads-up Displays (HUDs) and players involved in multiplayer games. In embodiments, 3-D images of the users/players are recreated with expressions and/or reactions within an interactive virtual reality, augmented reality, or mixed reality environment, such as but not limited to chatting and gaming environments. In embodiments, the expressions/reactions of the users/individuals/players are tracked in real time and thereby reflected through their corresponding 3-D images seen on a display. In this case, a 2-D frontal face image of the individual is used to create a replica of at least the face, in 3-D. At 1200, the system obtains an image of the individual from one of the sources including, but not limited to, an independent video camera, or a video camera integrated with a mobile or any other computing device.

At 1202, the system, according to various embodiments of the present specification, identifies key points on the 2-D image. In an embodiment, the system uses a plurality of programmatic instructions designed to graphically identify a plurality of key points, to identify at least 67 key points. Subsequently the system derives a texture map for the 2-D image. The system derives a texture map using the following steps. At 1204, the system identifies a plurality of non-overlapping, three-point regions based on the identified key points. The system uses Delaunay triangulation 1205 to define the three-point regions, based on the identified key points, as described above. At 1206, the system projects the triangulated 2-D image on UV map of the generic 3-D mesh model. At 1208, the system determines one or more positional relationships within the 2-D image. As described above, the positional relationships comprise a plurality of distances between anatomical features in the facial image, and ratios of those distances to a specific anatomical distance such as temple width, which are necessarily unique to the 2-D image. Similarly, the system determines one or more positional relationships within the generic 3-D mesh model of a face. As described above, the positional relationships comprise a plurality of proportions that are standard for a generic 3-D face model and comprise a plurality of distances between anatomical features in the 3-D face model, and ratios of those distances to a specific anatomical distance such as temple width, which define the generic 3-D face model.

At 1210, the system then uses proportions for the 2-D image and the corresponding proportions from the generic 3-D image to determine the scaling factors. At 1212, the system adjusts the 3-D model based on the determined scaling factors and at 1214, the system modifies 3-D display of the face based on expressions and/or reactions of the individual.

Figure 13:
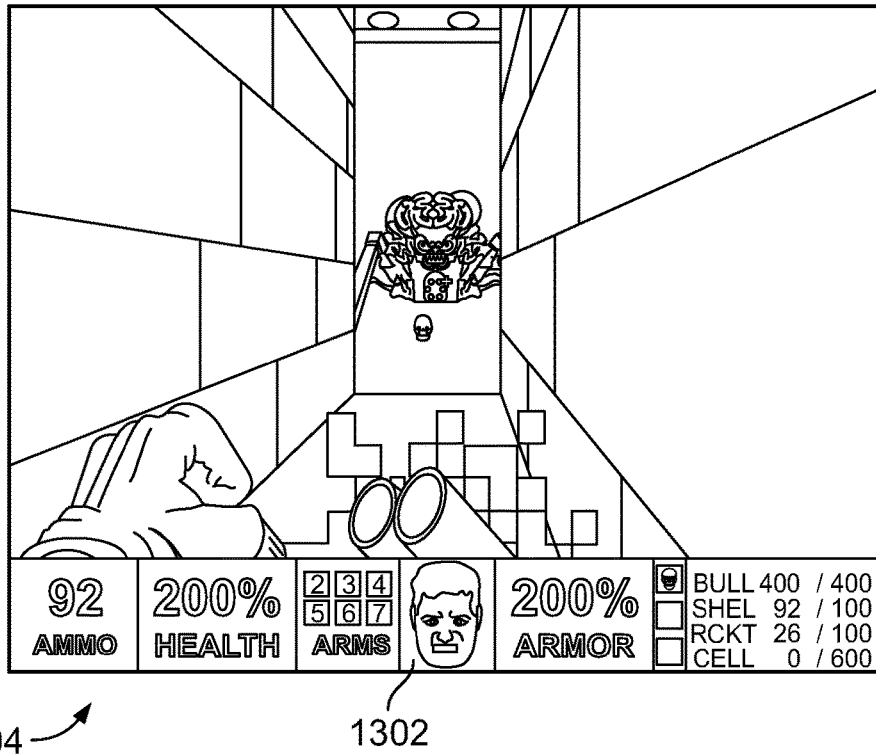
FIG. 13 illustrates exemplary images captured from gaming displays, in accordance with some embodiments of the present specification.
Figure 13:
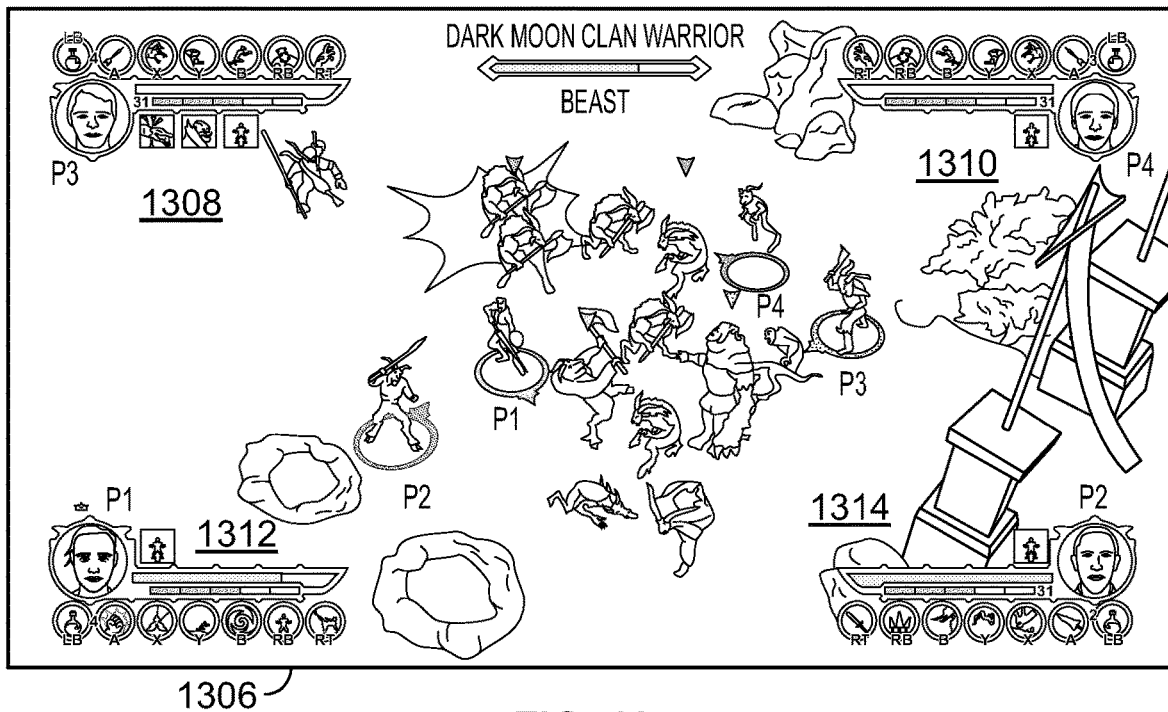

FIG. 13 illustrates exemplary images 1304 and 1306 captured from gaming displays. Image 1304 shows expressions/reactions of a player created using an embodiment of the present specification, and displayed as image 1302 of an otherwise faceless First Person Shooter (FPS) character in game using HUD. In an alternative multiplayer gaming environment 1306, expressions/reactions of four players in a game are each seen in images 1308, 1310, 1312, and 1314.

Figure 14:
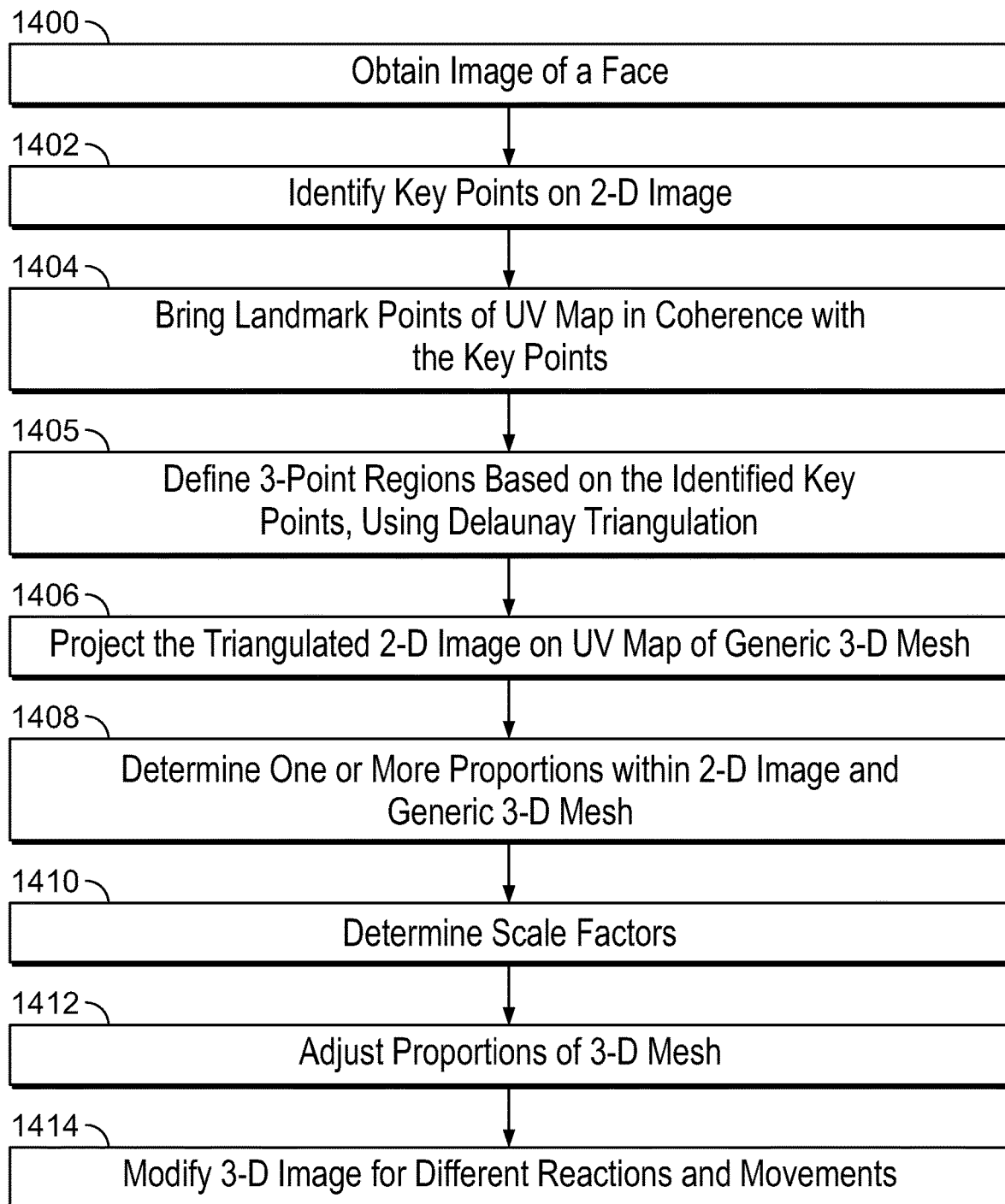
FIG. 14 is a flow chart illustrating an exemplary computer-implemented method to convert a 2-D image in to a 3-D image for display of players in gaming environments and other interactive display characters, which are controlled by real individuals, in accordance with some embodiments of the present specification.

FIG. 14 is a flow chart illustrating an exemplary computer-implemented method to convert a 2-D image in to a 3-D image for display of players in gaming environments and other interactive display characters, which are controlled by real individuals. In embodiments, 3-D images of the users/players are recreated with expressions and/or reactions within an interactive virtual reality, augmented reality, or mixed reality environment, such as but not limited to chatting and gaming environments. In embodiments, the expressions/reactions of the users/individuals/players are tracked in real time and thereby reflected through their corresponding 3-D images seen on a display. In this case, a 2-D frontal face image of the individual is used to create a replica of at least the face, in 3-D. At 1400, the system obtains an image of the individual from one of the sources including, but not limited to, an independent camera, a camera integrated with a mobile or any other computing device, or an image gallery accessible through a mobile or any other computing device.

At 1402, the system, according to various embodiments of the present specification, identifies key points on the 2-D image. In an embodiment, the system uses a plurality of programmatic instructions designed to graphically identify a plurality of key points, to identify at least 67 key points. Subsequently the system derives a texture map for the 2-D image. The system derives a texture map using the following steps. At 1404, the system identifies a plurality of non-overlapping, three-point regions based on the identified key points. The system uses Delaunay triangulation 1405 to define the three-point regions, based on the identified key points, as described above. At 1406, the system projects the triangulated 2-D image on UV map of the generic 3-D mesh model. At 1408, the system determines one or more positional relationships within the 2-D image. As described above, the positional relationships comprise a plurality of distances between anatomical features in the facial image, and ratios of those distances to a specific anatomical distance such as temple width, which are necessarily unique to the 2-D image. Similarly, the system determines one or more positional relationships within the generic 3-D mesh model of a face. As described above, the positional relationships comprise a plurality of proportions that are standard for a generic 3-D face model and comprise a plurality of distances between anatomical features in the 3-D face model, and ratios of those distances to a specific anatomical distance such as temple width, which define the generic 3-D face model.

At 1410, the system then uses proportions for the 2-D image and the corresponding proportions from the generic 3-D image to determine the scaling factors. At 1412, the system adjusts the 3-D model based on the determined scaling factors and at 1414, the 3-D display of the face is modified based on expressions and/or reactions and movements of the individual.

In an embodiment, the system is capable of rapidly generating a 3D image of a 2D face. In this embodiment, 3D images are created for each consecutive frame, or each frame after a pre-defined number of frames, obtained from a video captured through the camera. In an embodiment, the system uses a combination of programmatic instructions to identify frames from the video and use them to process according to the steps described above in context of FIG. 14. In the embodiment, facial expressions of a user are recreated through their 3D images on a frame by frame basis, thereby allowing for the generation of a plurality of 3D facial expressions, each corresponding to one of the frames.

Figure 15:
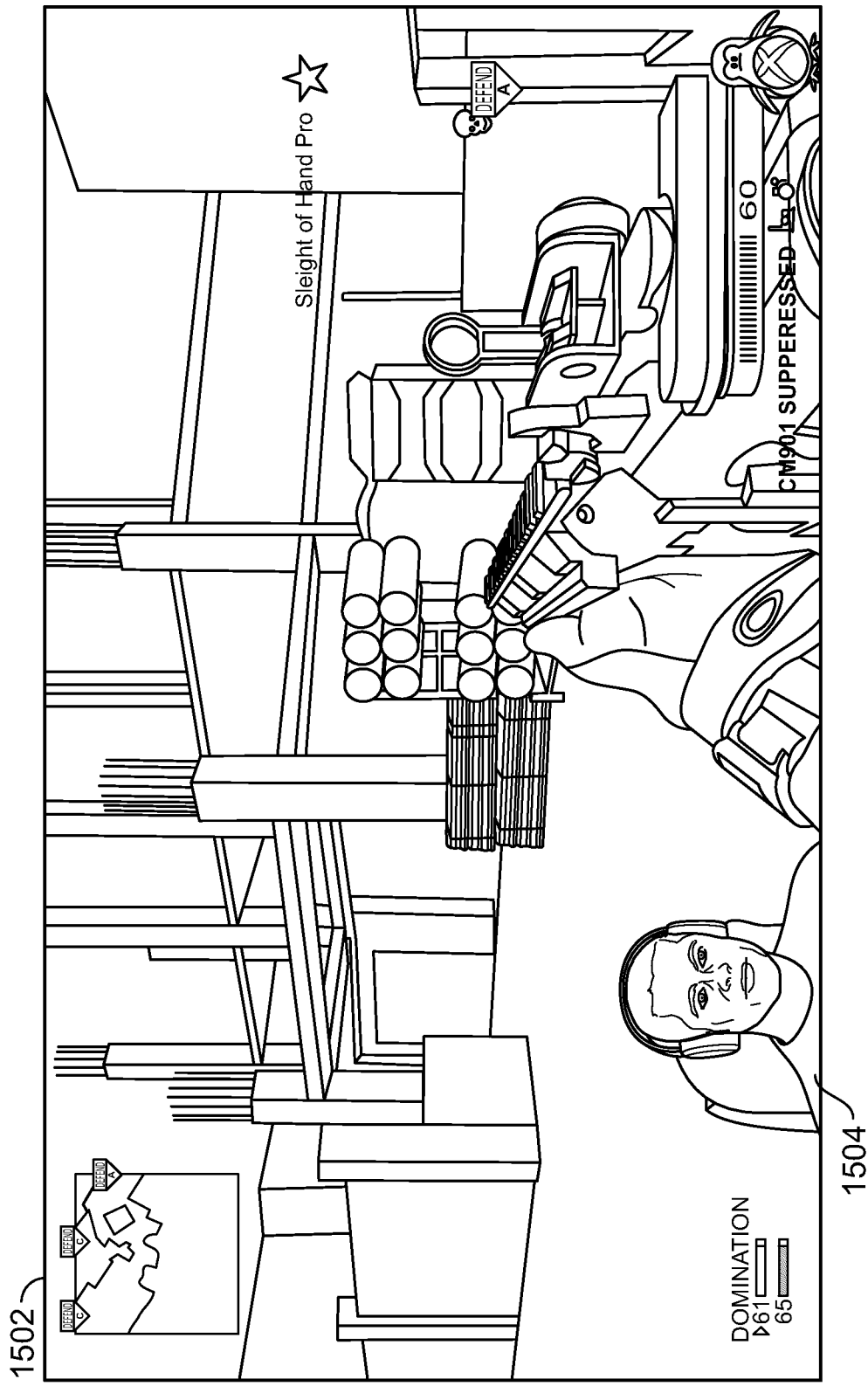
FIG. 15 illustrates a still image from a display of a gaming application, where a 3-D image of a user (player) is seen in the display, in accordance with some embodiments of the present specification.

FIG. 15 illustrates a still image 1502 from a display of a gaming application, where a 3-D image 1504 of a user (player) is seen in the display. In embodiments, the expressions/reactions and movements of image 1504 reflect the user's expressions/reactions and movements in real time.

Figure 16:
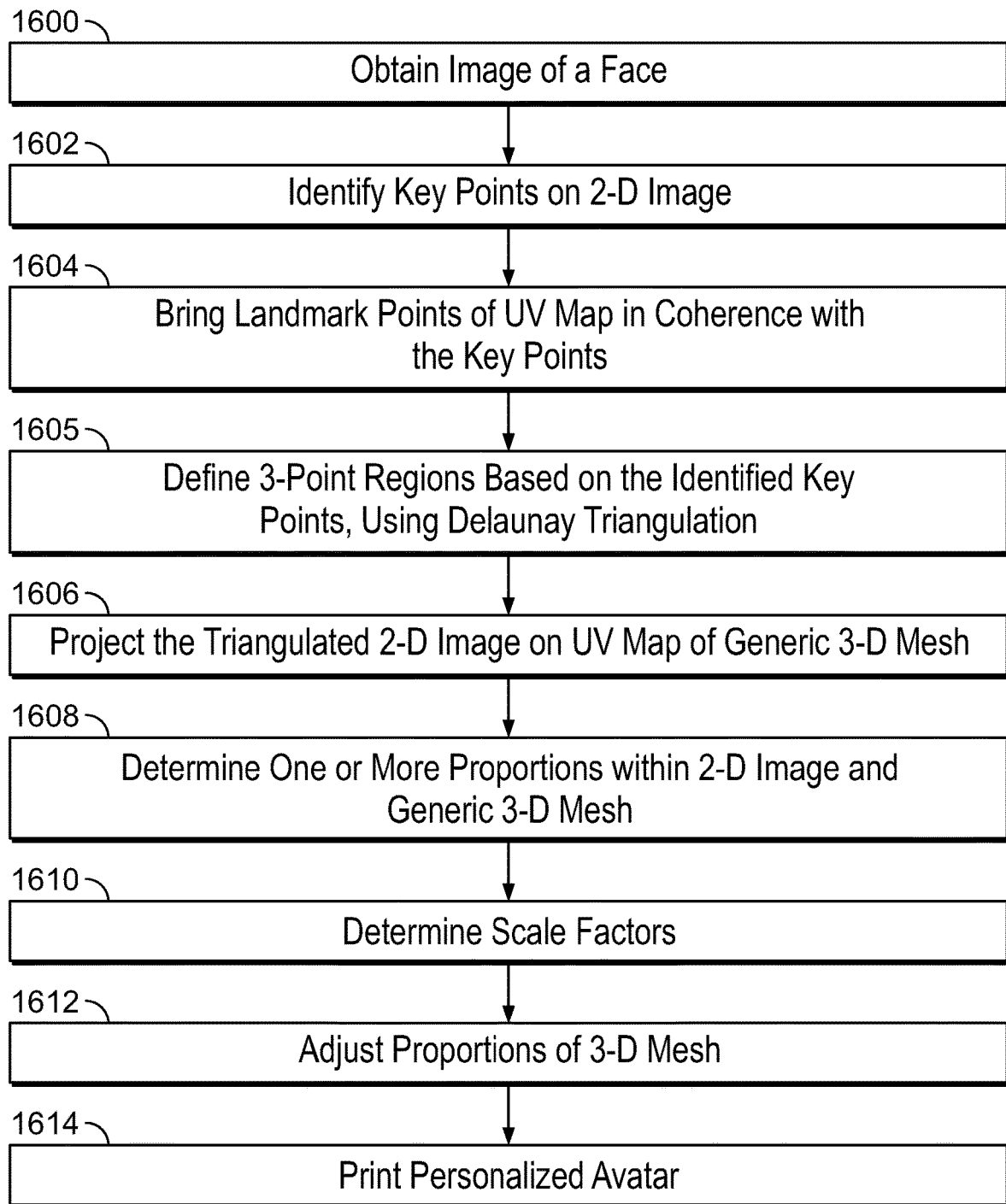
FIG. 16 is a flow chart illustrating an exemplary computer-implemented method to convert a 2-D image of an individual in to a 3-D image that may be used to print one or more personalized avatars of the individual, in accordance with some embodiments of the present specification.

FIG. 16 is a flow chart illustrating an exemplary computer-implemented method to convert a 2-D image of an individual in to a 3-D image that may be used to print one or more personalized avatars of the individual. In this case, a 2-D frontal face image of the individual is used to create a replica of at least the face, in 3-D. The recreated face in 3-D may then be combined with an image of a body to create a personalized avatar which can be printed using 3-D printing methods. At 1600, the system obtains an image of the individual from one of the sources including, but not limited to, an independent camera, a camera integrated with a mobile or any other computing device, or an image gallery accessible through a mobile or any other computing device.

At 1602, the system, according to various embodiments of the present specification, identifies key points on the 2-D image. In an embodiment, the system uses a plurality of programmatic instructions designed to graphically identify a plurality of key points, to identify at least 67 key points. Subsequently the system derives a texture map for the 2-D image. The system derives a texture map using the following steps. At 1604, the system identifies a plurality of non-overlapping, three-point regions based on the identified key points. The system uses Delaunay triangulation 1605 to define the three-point regions, based on the identified key points, as described above. At 1606, the system projects the triangulated 2-D image on UV map of the generic 3-D mesh model. At 1608, the system determines one or more positional relationships within the 2-D image. As described above, the positional relationships comprise a plurality of distances between anatomical features in the facial image, and ratios of those distances to a specific anatomical distance such as temple width, which are necessarily unique to the 2-D image. Similarly, the system determines one or more positional relationships within the generic 3-D mesh model of a face. As described above, the positional relationships comprise a plurality of proportions that are standard for a generic 3-D face model and comprise a plurality of distances between anatomical features in the 3-D face model, and ratios of those distances to a specific anatomical distance such as temple width, which define the generic 3-D face model.

Figure 17:
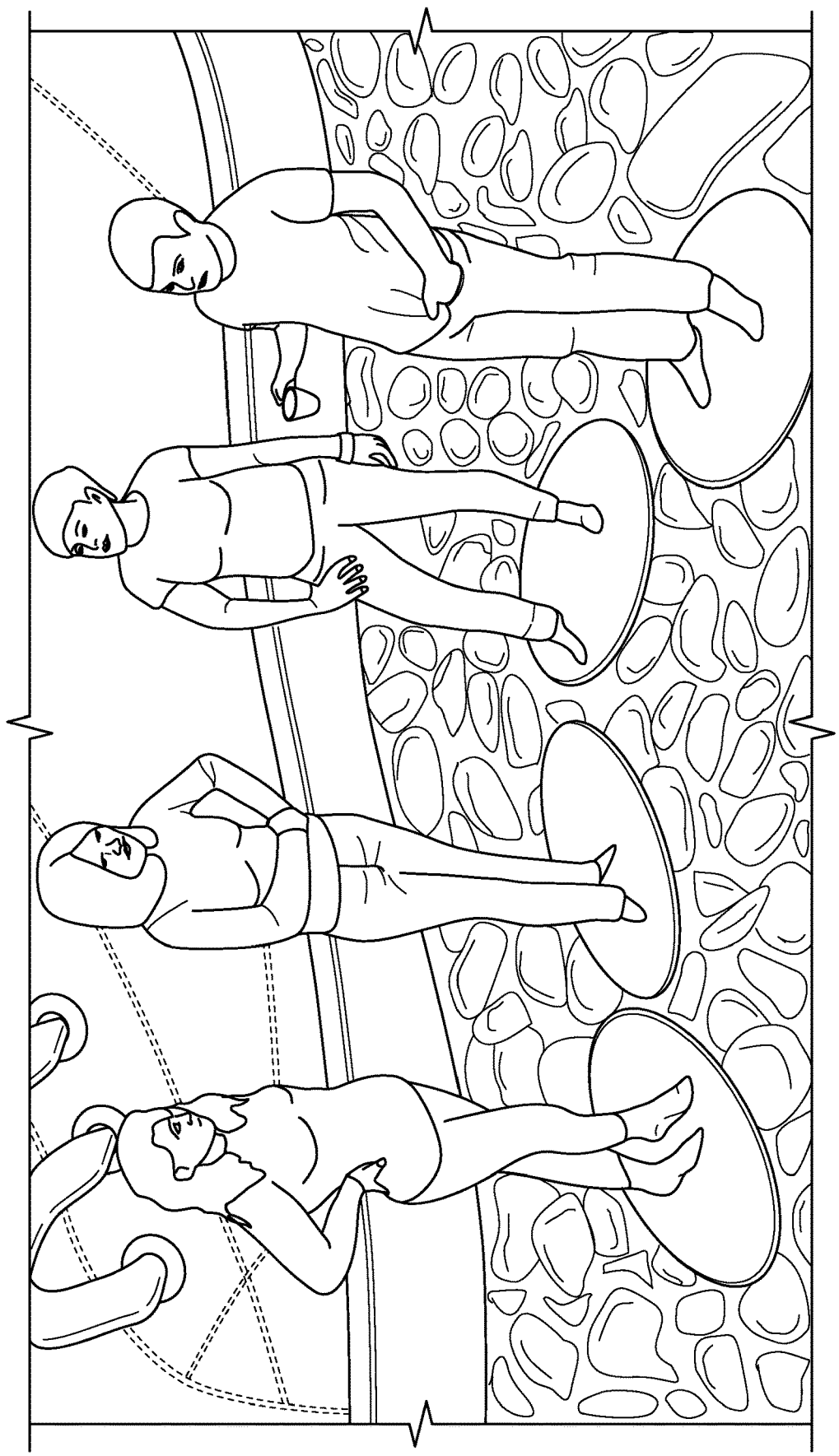
FIG. 17 illustrates some examples of different (four) avatars of different users printed using embodiments of the process described in context of FIG. 16.

At 1610, the system then uses proportions for the 2-D image and the corresponding proportions from the generic 3-D image to determine the scaling factors. At 1612, the system adjusts the 3-D model based on the determined scaling factors and at 1614, the system prints a personalized avatar of the 3-D display of the face. In embodiments, printing is performed using 3-D printing methods. FIG. 17 illustrates some examples of different (four) avatars of different users printed using embodiments of the process described in context of FIG. 16.

Figure 18:
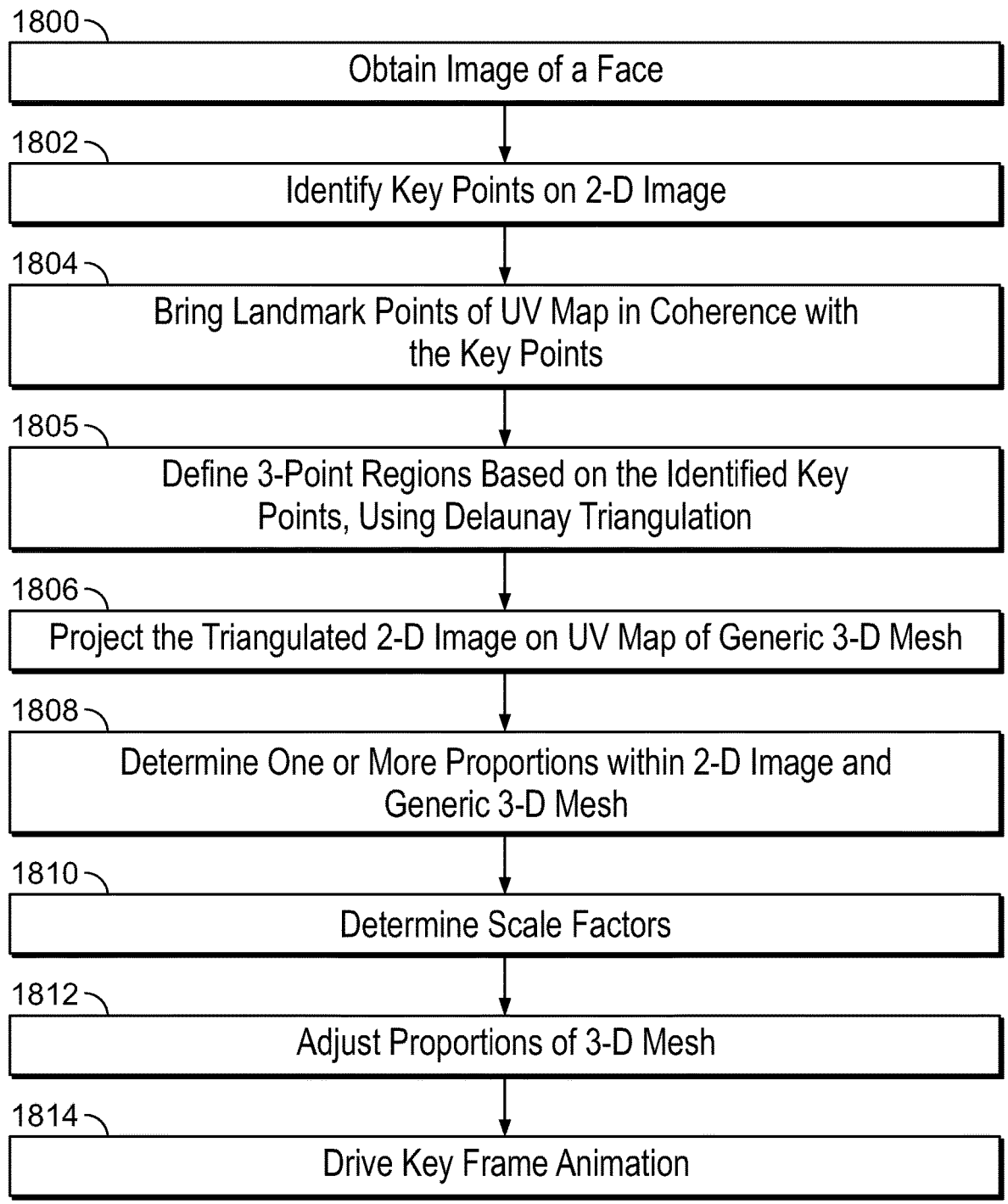
FIG. 18 is a flow chart illustrating an exemplary computer-implemented method to convert a 2-D image in to a 3-D image for driving key frame animation based on facial expressions of an individual, in accordance with some embodiments of the present specification.

FIG. 18 is a flow chart illustrating an exemplary computer-implemented method to convert a 2-D image in to a 3-D image for driving key frame animation based on facial expressions of an individual. In embodiments, the expressions/reactions of the users/individuals/players are tracked in real time and thereby reflected through their corresponding 3-D images seen on a display, which in turn is used to drive key frame animation. In this case, a 2-D frontal face image of the individual is used to create a replica of at least the facial expressions and movements of an animated figure, in 3-D. In embodiments, the animated figure could be one of the 3D image of the face of the user, an object, or any other face created for the animation. At 1800, the system obtains an image of the individual from one of the sources including, but not limited to, an independent video camera, a video camera integrated with a mobile or any other computing device, or a video gallery accessible through a mobile or any other computing device.

At 1802, the system, according to various embodiments of the present specification, identifies key points on the 2-D image. In an embodiment, the system uses a plurality of programmatic instructions designed to graphically identify a plurality of key points, to identify at least 67 key points. Subsequently the system derives a texture map for the 2-D image. The system derives a texture map using the following steps. At 1804, the system identifies a plurality of non-overlapping, three-point regions based on the identified key points. The system uses Delaunay triangulation 1805 to define the three-point regions, based on the identified key points, as described above. At 1806, the system projects the triangulated 2-D image on UV map of the generic 3-D mesh model. At 1808, the system determines one or more positional relationships within the 2-D image. As described above, the positional relationships comprise a plurality of distances between anatomical features in the facial image, and ratios of those distances to a specific anatomical distance such as temple width, which are necessarily unique to the 2-D image. Similarly, the system determines one or more positional relationships within the generic 3-D mesh model of a face. As described above, the positional relationships comprise a plurality of proportions that are standard for a generic 3-D face model and comprise a plurality of distances between anatomical features in the 3-D face model, and ratios of those distances to a specific anatomical distance such as temple width, which define the generic 3-D face model.

At 1810, the system then uses proportions for the 2-D image and the corresponding proportions from the generic 3-D image to determine the scaling factors. At 1812, the system adjusts the 3-D model based on the determined scaling factors and at 1814, the system drives key frame animation using the adjusted 3-D display of the face.

In an embodiment, the system is capable of rapidly generating a 3D image of a 2D face. In this embodiment, key frame animations are created for each consecutive frame, or each frame after a pre-defined number of frames, obtained from the video captured through the camera or taken from the video gallery. In an embodiment, the system uses a combination of programmatic instructions to identify frames from the video and use them to process according to the steps described above in context of FIG. 18. In the embodiment, key frame animations are created on a frame by frame basis, thereby allowing for the generation of a plurality of 3D facial images including expressions and movements of the user, each corresponding to one of the frames. In embodiments, additional animation effects are superimposed on the frames.

The above examples are merely illustrative of the many applications of the system of present invention. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

We claim:

1. A computer-implemented method for increasing a dimensional depth of a two-dimensional image to yield an augmented reality (AR) face mask, said method being implemented in a computer having a processor and a random access memory, wherein said processor is in data communication with a display and with a storage unit, the method comprising:

acquiring from the storage unit the two-dimensional image;

acquiring an image of a face of a person from a camera;

using said computer and executing a plurality of programmatic instructions stored in the storage unit, identifying a first plurality of key points on the two-dimensional image;

using said computer and executing a plurality of programmatic instructions stored in the storage unit, identifying a second plurality of key points on the two-dimensional image;

using said computer and executing a plurality of programmatic instructions stored in the storage unit, generating a texture map of the two-dimensional image;

using said computer and executing a plurality of programmatic instructions stored in the storage unit, projecting said texture map of the two-dimensional image onto the image of the face of the person;

using said computer and executing a plurality of programmatic instructions stored in the storage unit, modifying the first plurality of key points based on the second plurality of key points;
and using said computer, outputting the AR face mask image based on the modified first plurality of key points.

2. The computer-implemented method of claim 1, wherein each of the first plurality or second plurality of key points include points representative of a plurality of anatomical locations on the face, wherein said anatomical locations include points located on the eyebrows, eyes, nose, and lips.

3. The computer-implemented method of claim 1, wherein the texture map comprises a plurality of non-overlapping, triangular regions.

4. The computer-implemented method of claim 1, further comprising, using said computer and executing a plurality of programmatic instructions stored in the storage unit, determining a first set of one or more proportions within the two-dimensional image, determining a second set of one or more proportions within the image of the face of the person, and determining a plurality of scaling factors, wherein each of said scaling factors is a function of one of said first set of one or more proportions and a corresponding one of said second set of one or more proportions and wherein each of said plurality of scaling factors is a ratio of one of said first set of one or more proportions to the corresponding one of said second set of one or more proportions.

5. The computer-implemented method of claim 1, further comprising, using said computer and executing a plurality of programmatic instructions stored in the storage unit, determining a first set of one or more proportions within the two-dimensional image and determining a second set of one or more proportions within the image of the face of the person, wherein the determining the first set of one or more proportions within the two-dimensional image comprises determining proportions from measurements between at least two anatomical positions on the face of the person.

6. The computer-implemented method of claim 1, further comprising, using said computer and executing a plurality of programmatic instructions stored in the storage unit, determining a first set of one or more proportions within the two-dimensional image and determining a second set of one or more proportions within the image of the face of the person, wherein the determining a first set of one or more proportions within the two-dimensional image comprises determining a first anatomical distance and dividing said first anatomical distance by a second anatomical distance.

7. The computer-implemented method of claim 6, wherein the first anatomical distance is at least one of a lateral face width, a lateral jaw width, a lateral temple width, a lateral eyebrow width, a lateral chin width, a lateral lip width, and a lateral nose width and wherein the second anatomical distance is a distance between two temples of the face.

8. The computer-implemented method of claim 6, wherein the first anatomical distance is at least one of a vertically defined lip thickness, a vertical distance between a nose and a nose bridge, a vertical distance between a lip and a nose bridge, a vertical distance between a chin and a nose bridge, a vertical eye length, and a vertical distance between a jaw and a nose bridge and wherein the second anatomical distance is at least one of a distance between two anatomical positions on said face and a distance between two temples of the face.

9. The computer-implemented method of claim 6, wherein the first anatomical distance is a distance between two anatomical positions on said face and the second anatomical distance is a distance between a point located proximate a left edge of a left eyebrow of the face and a point located proximate a right edge of a right eyebrow of the face.

10. The computer-implemented method of claim 1, wherein the determining a second set of one or more proportions within the image of the face of the person comprises determining a first anatomical distance and dividing said first anatomical distance by a second anatomical distance.

11. The computer-implemented method of claim 10, wherein the first anatomical distance is at least one of a lip thickness, a distance between a nose and a nose bridge, a distance between a lip and a nose bridge, a distance between a chin and a nose bridge, an eye length, and a distance between a jaw and a nose bridge of the image of the face of the person and wherein the second anatomical distance is a distance between two anatomical positions on said image of the face of the person.

12. The computer-implemented method of claim 10, wherein the first anatomical distance is a distance between two anatomical positions on said image of the face of the person and the second anatomical distance is a distance between a point located proximate a left edge of a left eyebrow of the image of the face of the person and a point located proximate a right edge of a right eyebrow of the image of the face of the person.

13. A computer readable non-transitory medium comprising a plurality of executable programmatic instructions wherein, when said plurality of executable programmatic instructions are executed by a processor, a process for increasing a dimensional depth of a two-dimensional image to yield an augmented reality (AR) face mask is performed, said plurality of executable programmatic instructions comprising:

programmatic instructions, stored in said computer readable non-transitory medium, for acquiring from the storage unit the two-dimensional image;

programmatic instructions, stored in said computer readable non-transitory medium, for identifying a first plurality of key points on the two-dimensional image;

programmatic instructions, stored in said computer readable non-transitory medium, for identifying a second plurality of key points on the two-dimensional image;

programmatic instructions, stored in said computer readable non-transitory medium, for generating a texture map of the two-dimensional image;

programmatic instructions, stored in said computer readable non-transitory medium, for translating said texture map of the two-dimensional image onto an image of a face of a person acquired from a camera;

programmatic instructions, stored in said computer readable non-transitory medium, for modifying the first plurality of key points based on the second plurality of key points;

programmatic instructions, stored in said computer readable non-transitory medium, for outputting the AR face mask image based on the modified first plurality of key points.

14. The computer readable non-transitory medium of claim 13, wherein each of the first plurality or second plurality of key points include points representative of a plurality of anatomical locations on the face, wherein said anatomical locations include points located on the eyebrows, eyes, nose, and lips.

15. The computer readable non-transitory medium of claim 13, wherein the texture map comprises a plurality of non-overlapping, triangular regions.

16. The computer readable non-transitory medium of claim 13, further comprising programmatic instructions, stored in said computer readable non-transitory medium, for determining a first set of one or more proportions within the two-dimensional image and determining a second set of one or more proportions within the image of the face of the person, wherein the determining the first set of one or more proportions within the two-dimensional image comprises determining proportions from measurements between at least two anatomical positions on the face of the person.

17. The computer readable non-transitory medium of claim 13, further comprising programmatic instructions, stored in said computer readable non-transitory medium, for determining a first set of one or more proportions within the two-dimensional image, for determining a second set of one or more proportions within the image of the face of the person, and for determining a plurality of scaling factors, wherein each of said scaling factors is a function of one of said first set of one or more proportions and a corresponding one of said second set of one or more proportions and wherein each of said plurality of scaling factors is a ratio of one of said first set of one or more proportions to the corresponding one of said second set of one or more proportions.

18. The computer readable non-transitory medium of claim 13, further comprising programmatic instructions, stored in said computer readable non-transitory medium, for determining a first set of one or more proportions within the two-dimensional image and determining a second set of one or more proportions within the image of the face of the person, wherein the determining a first set of one or more proportions within the two-dimensional image comprises determining a first anatomical distance and dividing said first anatomical distance by a second anatomical distance.

19. The computer readable non-transitory medium of claim 18, wherein the first anatomical distance is at least one of a lateral face width, a lateral jaw width, a lateral temple width, a lateral eyebrow width, a lateral chin width, a lateral lip width, and a lateral nose width and wherein the second anatomical distance is a distance between two temples of the face.

20. The computer readable non-transitory medium of claim 18, wherein the first anatomical distance is at least one of a vertically defined lip thickness, a vertical distance between a nose and a nose bridge, a vertical distance between a lip and a nose bridge, a vertical distance between a chin and a nose bridge, a vertical eye length, and a vertical distance between a jaw and a nose bridge and wherein the second anatomical distance is a distance between two temples of the face.

21. The computer readable non-transitory medium of claim 18, wherein the first anatomical distance is a distance between two anatomical positions on said face and the second anatomical distance is a distance between a point located proximate a left edge of a left eyebrow of the face and a point located proximate a right edge of a right eyebrow of the face.

22. The computer readable non-transitory medium of claim 13, wherein the determining a second set of one or more proportions within the image of the face of the person comprises determining a first anatomical distance and dividing said first anatomical distance by a second anatomical distance.

23. The computer readable non-transitory medium of claim 22, wherein the first anatomical distance is at least one of a lip thickness, a distance between a nose and a nose bridge, a distance between a lip and a nose bridge, a distance between a chin and a nose bridge, an eye length and a distance between a jaw and a nose bridge of the image of the face of the person and wherein the second anatomical distance is a distance between two anatomical positions on said three-dimensional mesh image of the face of the person.

24. The computer readable non-transitory medium of claim 22, wherein the first anatomical distance is a distance between two anatomical positions on said image of the face of the person and the second anatomical distance is a distance between a point located proximate a left edge of a left eyebrow of the image of the face of the person and a point located proximate a right edge of a right eyebrow of the image of the face of the person.

* * * * *